(12) United States Patent
Takashima

(10) Patent No.: US 12,143,550 B2
(45) Date of Patent: Nov. 12, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Keiichi Takashima, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/230,804

(22) Filed: Aug. 7, 2023

(65) Prior Publication Data

US 2024/0073346 A1 Feb. 29, 2024

(30) Foreign Application Priority Data

Aug. 30, 2022 (JP) .................. 2022-137038

(51) Int. Cl.
*H04N 1/32* (2006.01)
*G06F 16/93* (2019.01)

(52) U.S. Cl.
CPC ......... *H04N 1/32475* (2013.01); *G06F 16/93* (2019.01); *H04N 1/32464* (2013.01)

(58) Field of Classification Search
CPC . H04N 1/32475; H04N 1/32464; G06F 16/93
See application file for complete search history.

(56) References Cited

U.S. PATENT DOCUMENTS

2012/0127544 A1* 5/2012 Morita ................. G03G 15/502
358/474

FOREIGN PATENT DOCUMENTS

JP 2002-312385 A 10/2002

* cited by examiner

*Primary Examiner* — Quang N Vo
(74) *Attorney, Agent, or Firm* — Venable LLP

(57) ABSTRACT

An information processing apparatus obtains scan images by collectively scanning a plurality of documents, each including page(s), divides the scan images into divided scan images corresponding to respective documents, converts the divided scan images into formatted files, thereby generating a plurality of files, saving the files individually, manages a common file identifier, ordinal position information of files, and identifying information of the individually saved files in association with each other, and displays, if a user instructs correcting one of the individually saved files, thumbnails of page images corresponding to the individually saved plurality of documents identified by the information managed in association with the same identifier as an identifier associated with information identifying the one file to be corrected. The thumbnails are displayed, based on the ordinal position information of the plurality of files, in an order in which the pages forming the plurality of files were scanned.

12 Claims, 24 Drawing Sheets

| DIVISION JOB ID | DOCUMENT ORDINAL POSITION INFORMATION | DOCUMENT ACCESS INFORMATION |
|---|---|---|
| 20211012_001 | 1 | ¥¥server01¥20211012¥001¥file001.pdf |
| 20211012_001 | 2 | ¥¥server01¥20211012¥001¥file002.pdf |
| 20211012_001 | 3 | ¥¥server01¥20211012¥001¥file003.pdf |
| 20211012_002 | 1 | ¥¥server01¥20211012¥002¥file001.pdf |
| 20211012_002 | 2 | ¥¥server01¥20211012¥002¥file002.pdf |

| DIVISION JOB ID | DOCUMENT ORDINAL POSITION INFORMATION | CORRECTION TYPE | DIVISION POSITION | CORRECTION TARGET |
|---|---|---|---|---|
| 20211012_001 | 1 | DELETE | 2 | 0 |
| 20211012_001 | 2 | ADD | 3 | 1 |

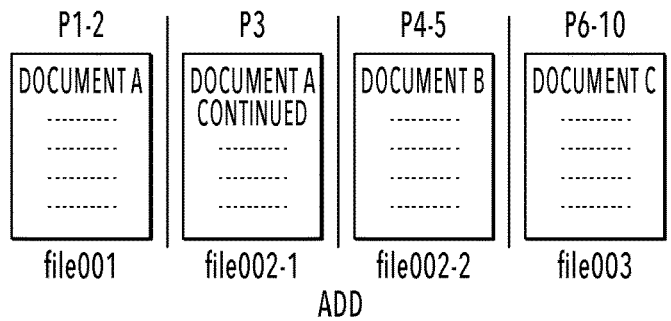

FIG.17A

| | 1701 | 1702 | 1703 | 1704 |
|---|---|---|---|---|
| | DIVISION JOB ID | DOCUMENT ORDINAL POSITION INFORMATION | DOCUMENT ACCESS INFORMATION | CORRECTION TARGET |
| 1705 | 20211012_001 | 1 | ¥¥server01¥20211012¥001¥file001.pdf | 0 |
| 1706 | 20211012_001 | 2 | ¥¥server01¥20211012¥001¥file002-1.pdf | 0 |
| 1707 | 20211012_001 | 2 | ¥¥server01¥20211012¥001¥file002-2.pdf | 1 |
| 1708 | 20211012_001 | 3 | ¥¥server01¥20211012¥001¥file003.pdf | 0 |

FIG.17B

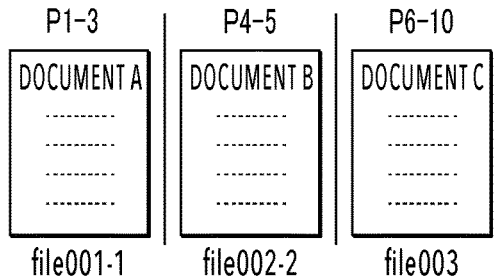

FIG.17C

| | 1701 | 1702 | 1703 | 1704 |
|---|---|---|---|---|
| | DIVISION JOB ID | DOCUMENT ORDINAL POSITION INFORMATION | DOCUMENT ACCESS INFORMATION | CORRECTION TARGET |
| 1705 | 20211012_001 | 1 | ¥¥server01¥20211012¥001¥file001-1.pdf | 0 |
| 1707 | 20211012_001 | 2 | ¥¥server01¥20211012¥001¥file002-2.pdf | 1 |
| 1708 | 20211012_001 | 3 | ¥¥server01¥20211012¥001¥file003.pdf | 0 |

| | 1901 | 1902 | 1903 | 1904 |
|---|---|---|---|---|
| | DIVISION JOB ID | DOCUMENT ORDINAL POSITION INFORMATION | DOCUMENT ACCESS INFORMATION | DOCUMENT PAGE IMAGE INFORMATION |
| 1905 | 20211012_001 | 1 | ¥¥server01¥20211012¥001¥file001.pdf | ¥¥server01¥image¥20211012_001_001.tiff |
| 1906 | 20211012_001 | 2 | ¥¥server01¥20211012¥001¥file002.pdf | ¥¥server01¥image¥20211012_001_002.tiff |
| 1907 | 20211012_001 | 3 | ¥¥server01¥20211012¥001¥file003.pdf | ¥¥server01¥image¥20211012_001_003.tiff |
| 1908 | 20211012_002 | 1 | ¥¥server01¥20211012¥002¥file001.pdf | ¥¥server01¥image¥20211012_002_001.tiff |
| 1909 | 20211012_002 | 2 | ¥¥server01¥20211012¥002¥file002.pdf | ¥¥server01¥image¥20211012_002_002.tiff |

FIG.24A

| DIVISION JOB ID | DOCUMENT ORDINA POSITION INFORMATION | DOCUMENT ACCESS INFORMATION | DOCUMENT PAGE IMAGE INFORMATION | CORRECTION TARGET |
|---|---|---|---|---|
| 20211012_001 | 1 | ¥¥server01¥20211012¥001¥file001.pdf | ¥¥server01¥image¥20211012_001_001.tiff | 0 |
| 20211012_001 | 2 | ¥¥server01¥20211012¥001¥file002-1.pdf | ¥¥server01¥image¥20211012_001_002-1.tiff | 0 |
| 20211012_001 | 2 | ¥¥server01¥20211012¥001¥file002-2.pdf | ¥¥server01¥image¥20211012_001_002-2.tiff | 1 |
| 20211012_001 | 3 | ¥¥server01¥20211012¥001¥file003.pdf | ¥¥server01¥image¥20211012_001_003.tiff | 0 |

FIG.24B

| DIVISION JOB ID | DOCUMENT ORDINA POSITION INFORMATION | DOCUMENT ACCESS INFORMATION | DOCUMENT PAGE IMAGE INFORMATION | CORRECTION TARGET |
|---|---|---|---|---|
| 20211012_001 | 1 | ¥¥server01¥20211012¥001¥file001-1.pdf | ¥¥server01¥image¥20211012_001_001-1.tiff | 0 |
| 20211012_001 | 2 | ¥¥server01¥20211012¥001¥file002-2.pdf | ¥¥server01¥image¥20211012_001_002-2.tiff | 1 |
| 20211012_001 | 3 | ¥¥server01¥20211012¥001¥file003.pdf | ¥¥server01¥image¥20211012_001_003.tiff | 0 |

INFORMATION PROCESSING APPARATUS, INFORMATION PROCESSING METHOD, AND STORAGE MEDIUM

CROSS-REFERENCE TO PRIORITY APPLICATION

This application claims the benefit of Japanese Patent Application No. 2022-137038 filed Aug. 30, 2022, which is hereby incorporated by reference herein in its entirety.

BACKGROUND

Field

The present disclosure relates to a technique for dividing a group of scan images that are in units of pages

Description of the Related Art

In one of methods for digitizing documents, a group of scan images in units of pages that is produced by collective scanning of a plurality of documents is divided at a predetermined division position to generate digitized documents in units of documents.

In a method of determining a division position described in Japanese Patent Laid-Open No. 2002-312385, a group of scan images produced by collective scanning of a plurality of documents is analyzed, and a division position to break the group of scan images is determined based on the results of the analysis.

However, in a method like the one in Japanese Patent Laid-Open No. 2002-312385, which determines a division position based on analysis results, the division position may be determined incorrectly. For example, a case may occur in which a document file generated by division at an incorrect division position only includes a page or pages of the first half of a given document and does not include a page or pages of the second half which the given document is supposed to include. In this case, a user needs to find a document file that includes the page of the second half. The user also needs to divide the document including the page of the second half that they found and merge a document file of the page of the second half that has been produced by the division with the document file of the pages of the first half. In this way, incorrect determination of division position would cause trouble for a user because they have to correct the document file.

SUMMARY

An information processing apparatus of the present disclosure includes: one or more memories that store instructions, and one or more processors that execute the instructions to obtain scan images produced by collectively scanning a plurality of documents each of which includes one or more pages, to divide the obtained scan images into divided scan images corresponding to the respective plurality of documents, to convert the divided scan images into files in a predetermined format and thereby generate a plurality of files, and to associate an identifier shared by the plurality of files with information identifying each of the plurality of the files.

Further features of the present disclosure will become apparent from the following description of exemplary embodiments with reference to the attached drawings.

BRIEF DESCRIPTION OF THE DRAWINGS

FIGS. 17A to 17D are diagrams showing examples of generated-document information correction results;

FIG. 19 is a diagram illustrating an example of generated-document information;

FIGS. 24A and 24B are diagrams showing examples of generated-document information correction results.

DESCRIPTION OF THE EMBODIMENTS

The following describes embodiments of a technique of the present disclosure based on the drawings. Note that the following embodiments are not intended to limit the technique of the present disclosure, and not all the configurations described in the following embodiments are necessarily essential as the units provided by the technique of the present disclosure to solve the problem.

Embodiment 1

Figure 1:
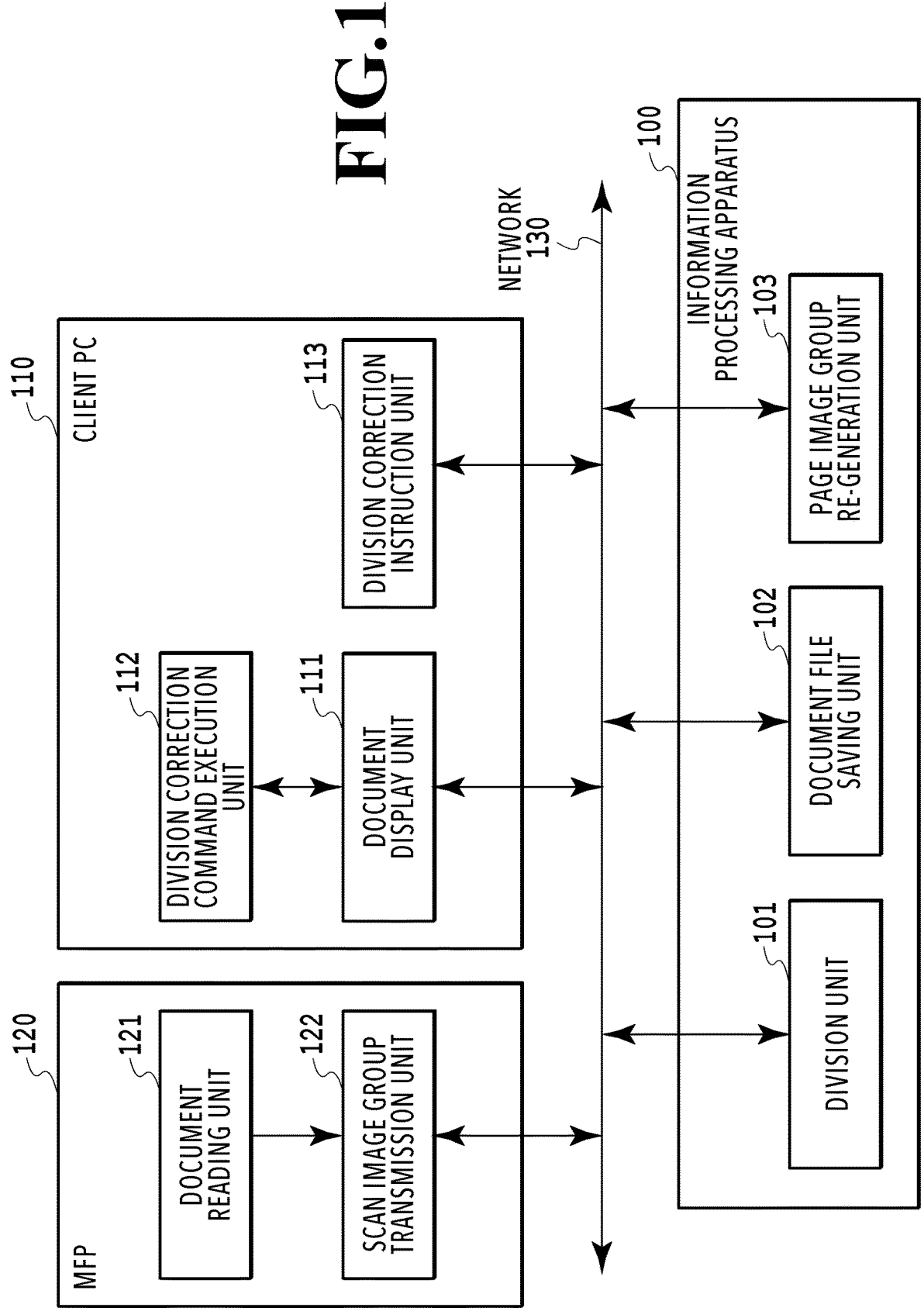
FIG. 1 is a block diagram showing the functions of apparatuses forming a system.

FIG. 1 is a diagram illustrating the system configuration of a document digitization system of the present embodiment. The document digitization system has a multifunction peripheral (MFP) 120, a client PC 110, and an information processing apparatus 100. A network 130 is used by the apparatuses to communicate information.

The MFP 120 is a multifunctional copying machine including functions such as, for example, a scanning function. The MFP 120 includes at least a document reading unit 121 and a scan image group transmission unit 122. The document reading unit 121, which is, for example, a scanner, optically reads a bundle of scan-target paper documents and generates a group of scan images in units of pages.

Although a group of images in units of pages is generated through optical reading of paper documents in the present embodiment described herein, a digital document may be divided in units of pages and used as a group of images in units of pages. Also, data formats for a group of page images in units of pages include ones that turn files of the group of images in units of pages into a set of files, such as bitmap and Joint Photographic Experts Group (JPEG), or ones that turn the group of images for a plurality of pages into one file, such as Tagged Image File Format (TIFF). However, the present disclosure is not limited to them. Document formats such as portable document format (PDF) or MS-Word may also be used.

Via the network 130, the scan image group transmission unit 122 transmits a group of scan images in units of pages produced by the document reading unit 121 by reading paper documents to the information processing apparatus 100 having a division unit 101.

The information processing apparatus 100 is a server computer connected to the network 130. The information processing apparatus 100 obtains, from the MFP 120, a group of scan images produced by scanning of paper documents, divides the group of scan images at a division position, and converts each scan image (or group of scan images) produced by the division into a document file.

The information processing apparatus 100 has the following functional units: the division unit 101, a document file saving unit 102, and a page image group re-generation unit 103. Details of these functional units will be described later. For example, the functional units are implemented by a CPU 202 (see FIG. 2) of the information processing apparatus by executing programs stored in a ROM 203 (see FIG. 2) or programs, such as applications, loaded from a storage apparatus 205 (see FIG. 2) into a RAM 204 (see FIG. 2). Results of processing execution are held in the RAM 204 (see FIG. 2). Note that at least part of the division unit 101, the document file saving unit 102, and the page image group re-generation unit 103 may be implemented by a different information processing apparatus connected to a different network 130 or may be implemented on the MFP 120.

The client PC 110 has the following functional units: a document display unit 111, a division correction command execution unit 112, and a division correction instruction unit 113. At least part of the document display unit 111, the division correction command execution unit 112, and the division correction instruction unit 113 may be implemented on the MFP 120 or on the information processing apparatus 100.

The document display unit 111 is general-purpose application software for displaying a document file on the screen. In a case when plug-ins are supported, function expansion can be done by installation of plug-in software. In an example described in the present embodiment, a PDF document file generated by a document division operation is displayed on a display apparatus (not shown) of the client PC 110 by Adobe Acrobat Reader (registered trademark), and a document division function is then executed. In other words, the document display unit 111 is described here as being a function implemented by Adobe Acrobat Reader (registered trademark) (hereafter referred to as Acrobat Reader). Acrobat Reader supports plug-ins, and function expansion can be done by installation of plug-in software. Plug-in processing can be executed using the UI on the Acrobat Reader. Conversely, plug-in software can be used to edit a document displayed by the Acrobat Reader or obtain information on the document displayed by the Acrobat Reader.

The division correction command execution unit 112 is plug-in software that expands the function of the document display unit 111.

The division correction instruction unit 113 is application software that enables a user to instruct a division position (to be described later) by operating a GUI. Details of the functional units will be described later.

[Hardware Configuration]

Figure 2:
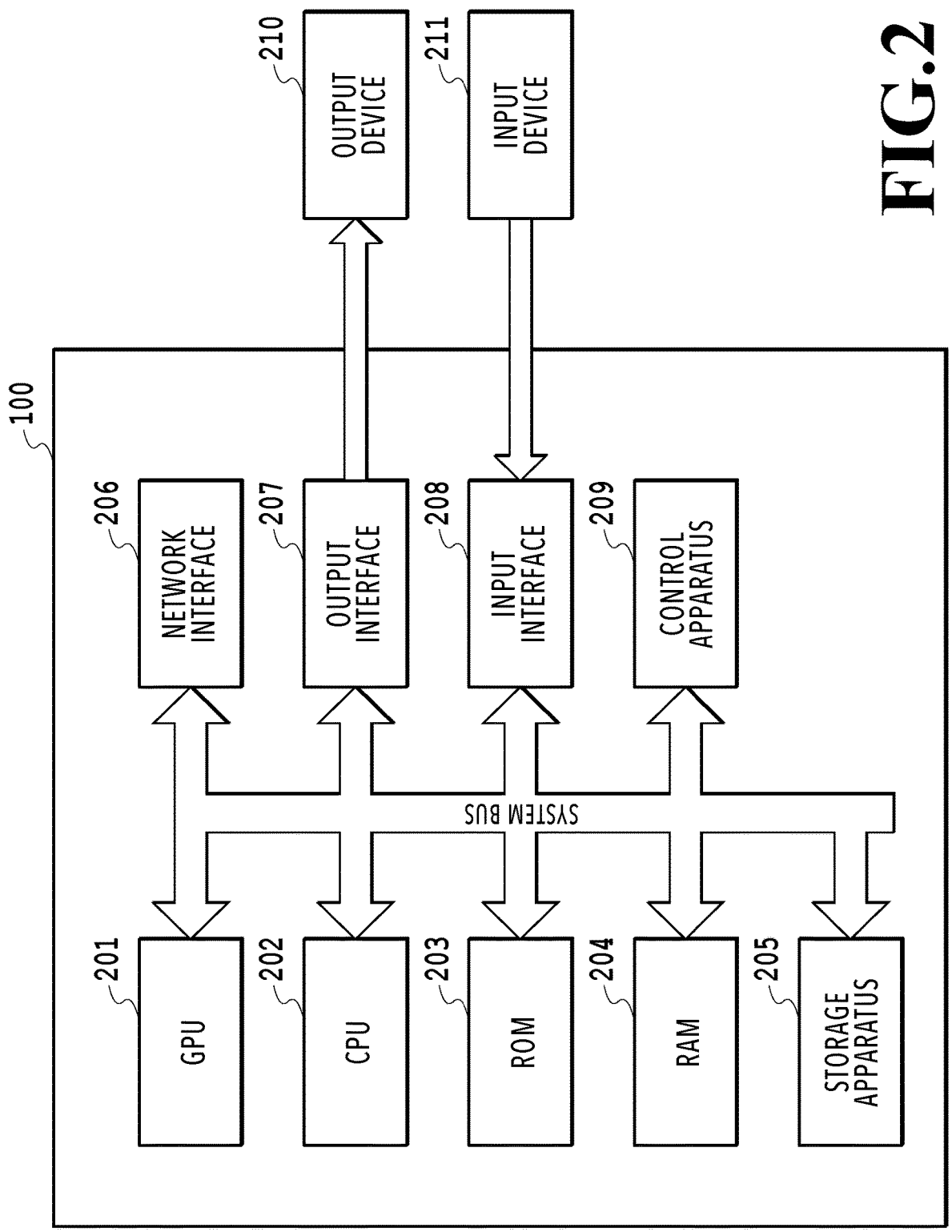
FIG. 2 is a diagram showing the hardware configuration of an information processing apparatus.

FIG. 2 is a diagram showing the hardware configuration of the information processing apparatus 100 of the present embodiment. The information processing apparatus 100 has, around the system bus, a GPU 201, the CPU 202, the ROM 203, the RAM 204, the storage apparatus 205, a network interface 206, an output interface 207, an input interface 208, and a control apparatus 209.

The CPU 202 executes programs stored in the ROM 203 by loading them into the RAM 204. Also, in a case when an output device 210 is a display unit, the CPU 202 operates as a display control unit that controls a screen displayed on the display unit. Also, in a case when an input device 211 is an operation unit to which a user inputs instructions, the CPU 202 also operates as an operation control unit that controls the operation unit.

The output interface 207 is an interface for enabling output to the external output device 210. The input interface 208 is an interface for enabling input from the external input device 211.

[Operation for Dividing a Group of Scan Images]

A description is given of processing performed by the document digitization system of the present embodiment to divide a group of scan images for a plurality of pages, which is produced by collective reading of a plurality of paper documents, into scan images in units of documents.

Figure 3:
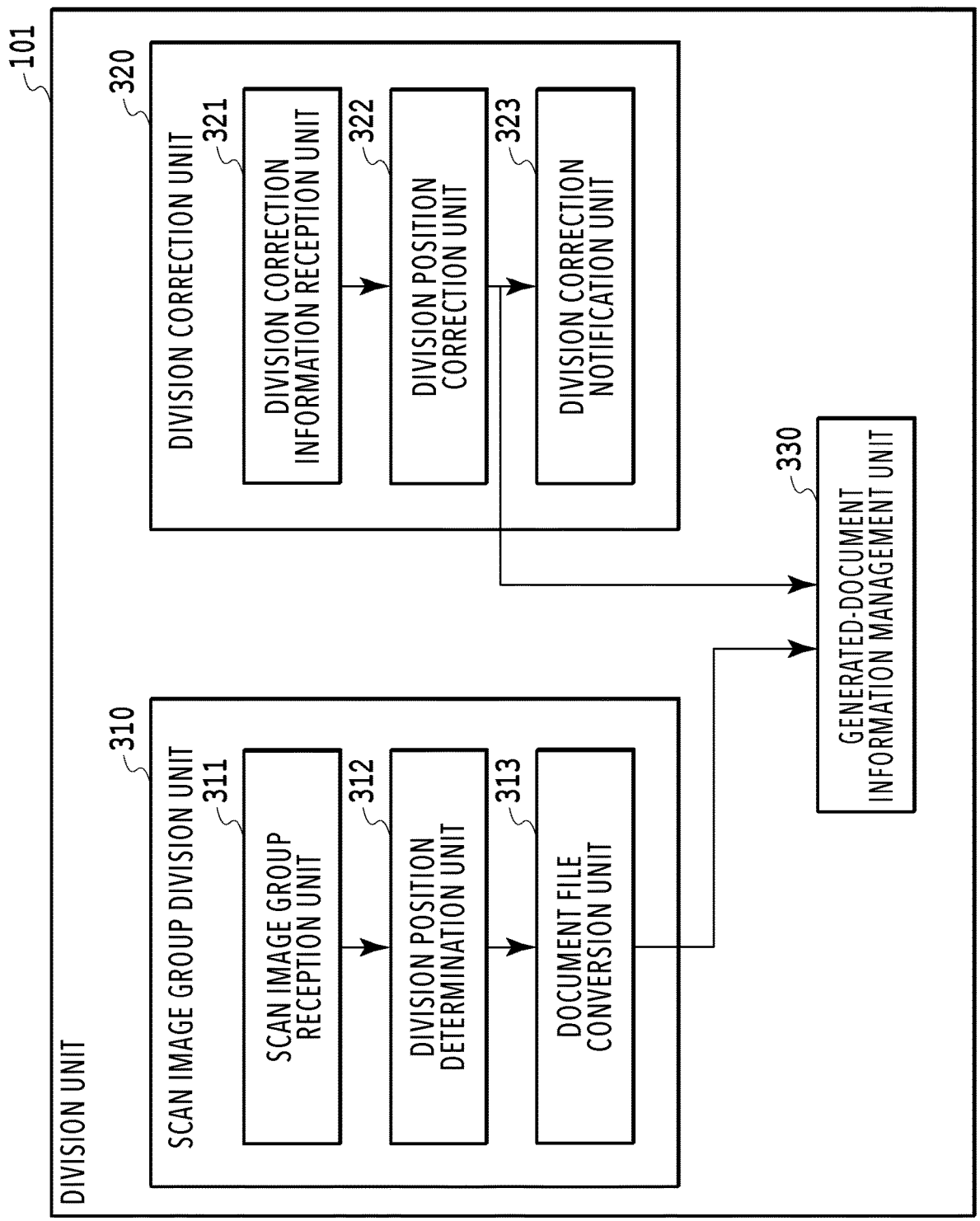
FIG. 3 is a block diagram showing details of the functions of a division unit of the information processing apparatus.

FIG. 3 is a detailed functional block diagram of the division unit 101 included in the information processing apparatus 100. The division unit 101 has a scan image group division unit 310, a division correction unit 320, and a generated-document information management unit 330.

The scan image group division unit 310 is described here. The scan image group division unit 310 has a scan image group reception unit 311, a division position determination unit 312, and a document file conversion unit 313.

The scan image group reception unit 311 receives, from the MFP 120, a group of scan images in units of pages that is produced by collective reading of a plurality of paper documents by the document reading unit 121 of the MFP 120.

The division position determination unit 312 determines a division position within the group of scan images in units of pages received by the scan image group reception unit 311. A boarder between different documents is determined as a division position. Then, a group of scan images is divided at the division position so that the scan images may be grouped in units of documents. Although scan image(s) as a result of being grouped in units of documents may be formed by a single scan image, it is described as scan images in units of documents for descriptive convenience.

In a division position determination method described in the present embodiment, a division position is determined based on text data extracted from each scan image. Specifically, optical character reader (OCR) is used to extract text data from each scan image. Then, based on features obtained by vectorization of the text data, it is determined whether a pair of adjacent pages (called paired pages) belong to the same document or different documents. In a case when it is determined that the paired pages belong to different documents, a division position is determined in between those paired pages. The first one of the paired pages adjacent to each other with the division position in between (the one with a smaller page number) may be called a division page.

This determination is made using, for example, a trained model. Specifically, the determination is made based on inferences using a text classifier (a trained model) produced by machine learning of a massive number of documents. With input being features of paired pages and output being break information (indicating whether the paired pages belong to the same document or different documents), machine learning is performed using correct break information as training data. Also, features may include not only features based on text data, but also features based on information such as an image (such as a seal, a signature, or a logo) or a table.

The document file conversion unit 313 converts each of scan images in units of documents produced by the division by the division position determination unit 312 into a document file. The document file saving unit 102 of the information processing apparatus 100 saves the document file in a save region in the storage apparatus 205 of the information processing apparatus 100. Although the document file conversion unit 313 in the present embodiment is described as one that converts the divided scan images in units of documents into PDF document files, the file format is not limited to PDF. Descriptions of the division correction unit 320 and the generated-document information management unit 330 will be given later.

Figure 4:
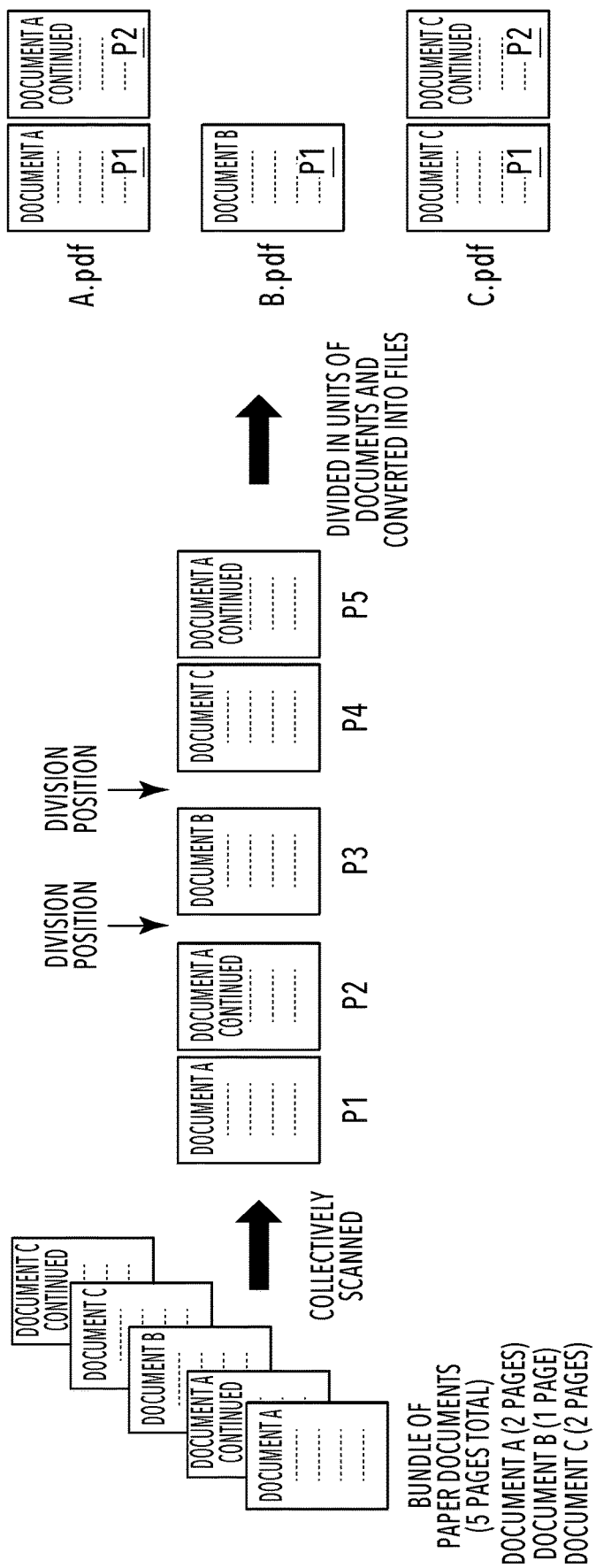
FIG. 4 is a diagram illustrating processing to generate document files by dividing a group of scan images.

FIG. 4 is a diagram illustrating how a group of scan images is divided. The left part of FIG. 4 shows a bundle of a total of five paper documents: a document A formed of two pages, a document B formed of one page, and a document C formed of two pages. The MFP 120 scans these paper documents collectively as originals, and a five-page group of scan images is thereby generated. The information processing apparatus 100 receives this group of scan images. The division position determination unit 312 determines a division position at the following locations: between page 2 and page 3 and between page 3 and page 4. Then, the group of scan images is divided to group pages from the first page to the page before the first division position and to group a page from the page after the division position to the page before the next division position. According to the information processing apparatus 100 of the present embodiment, even after a plurality of paper documents are scanned collectively, a group of scan images produced as a result of that can be divided into documents, and files on those documents can be generated.

[Generated-Document Information]

Referring back to FIG. 3, next, a description is given of the generated-document information management unit 330 included in the division unit 101 of the information processing apparatus 100. The generated-document information management unit 330 generates pieces of generated-document information corresponding to the respective document files generated by the document file conversion unit 313. The generated-document information management unit 330 manages the pieces of generated-document information that it generated by saving them in the ROM 203 or the storage apparatus 205 as part of the log of the information processing apparatus 100. The generated-document information management unit 330 generates a single piece of generated-document information for a single document file generated by the document file conversion unit 313.

Figures 5A, 5B:
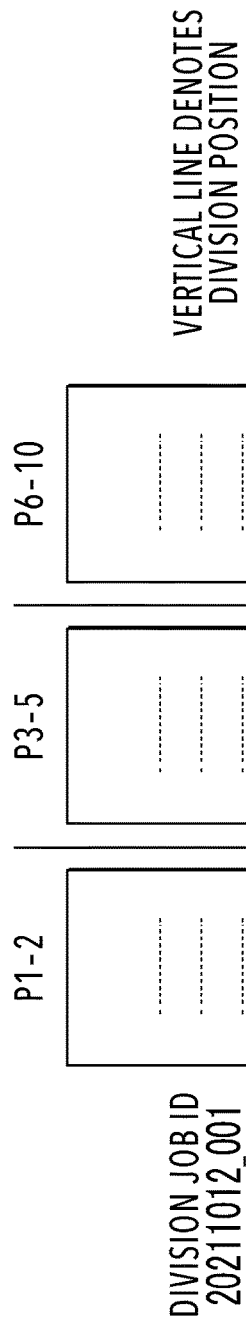
FIGS. 5A and 5B are diagrams illustrating an example of generated-document information.

FIGS. 5A and 5B are diagrams illustrating the generated-document information. In the example shown, as a result of collective scanning of different documents, namely, documents A, B, and C, a group of scan images in units of pages is generated, including all the pages of the documents A, B, and C. Then, as shown in FIG. 5A, the group of scan images is divided to generate a document file "file001," a document file "file002," and a document file "file003." In this case, the generated-document information management unit 330 generates three pieces of generated-document information corresponding to the three document files generated.

FIG. 5B is a diagram showing a table of pieces of generated-document information on respective document files. Each of rows 504 to 508 of the table in FIG. 5B holds a single piece of generated-document information (on a single document file). For example, the row 504 holds the generated-document information on the document file "file001" in FIG. 5A. The generated-document information includes "division job ID," "document ordinal position information," and "document access information."

A column 501 of the table in FIG. 5B holds the "division job ID" assigned to each document file. The "division job ID" is an ID created at the execution of document division to uniquely identify a document division job. The same division job ID is given to a plurality of document files generated from the same group of scan images produced by collective scanning of a bundle of a plurality of documents. For example, the document files in FIG. 5A are generated from a group of scan images produced by collective scanning of the documents A, B, and C. Thus, the document files in FIG. 5A are given the same value "20211012_001" as a division job ID. For this reason, according to the present embodiment in which a shared identifier is given to document files generated by division of the same group of scan images, it is easy to collect the document files generated by division of the same group of scan images. Thus, as will be described later, it is less troublesome to correct a document file.

A column 502 of the table holds the "document ordinal position information" assigned to each document file. The "document ordinal position information" is a value indicating the ordinal position of a document file in the undivided group of scan images. For example, as shown in the rows 504 to 506 in FIG. 5A, the document file scanned first and generated first among the group of scan images is the document file "file001." Then, the document file corresponding to an original that was scanned next is the document file "file002." In this example, on the row 504 holding the generated-document information on the document file "file001," "1" representing that the document file "file001" is the original that was scanned first is held in the column 502 as the "document ordinal position information." Then, on the row 505 holding the generated-document information on the next document file "file002," "2" is held in the column 502 as the "document ordinal position information." In other words, the column 502 holds the order in which the files were generated from the group of scan images produced by collective scanning of a plurality of documents.

A column 503 of the table holds "document access information." The "document access information" is information used to access and to read a corresponding document file. Specifically, the column 503 holds information on the places (the locations) where the document file saving unit 102 saved the respective document files. In the present embodiment, file paths in the UNC file system are held.

[Document File Targeted for Document Division Position Correction]

Next, an operation for correcting a division position is described. As described earlier, the division position determination unit 312 of the information processing apparatus 100 determines a division position so that a group of scan images in units of pages including a plurality of documents may be divided in units of documents. However, the division position determination unit 312 may determine a division position incorrectly in some cases.

Figure 6A:
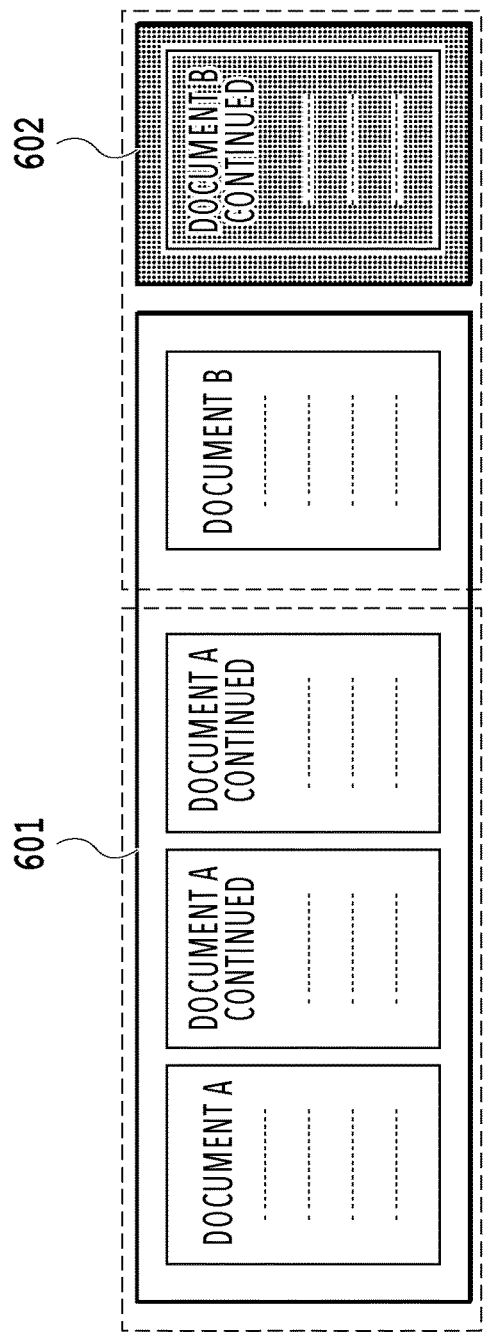
FIGS. 6A and 6B are diagrams illustrating document files generated using a wrong division position.
Figure 6B:
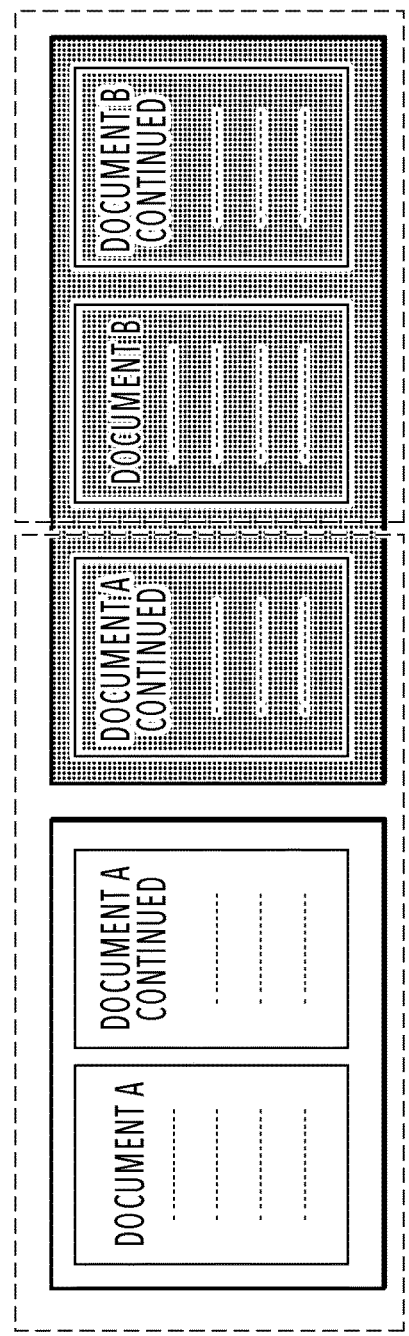

FIGS. 6A and 6B are diagrams illustrating examples of document files generated as a result of incorrect determination of a division position for a group of scan images. In FIGS. 6A and 6B, the images in each solid-line frame indicate pages of a document file generated based on a division position incorrectly determined by the division position determination unit 312, and the images in each dotted-line frame indicate pages of a document file generated based on a correctly determined division position.

FIG. 6A is a diagram showing the following example: even though a document B had been scanned after a document A, the location between the last page of the document A and the first page of the document B was not determined as a division position, and the location between the first and second pages of the document B was determined incorrectly as a division position. Thus, a document file 601 including all the pages of the document A and the first page of the document B and a document file 602 including the rest of the pages of the document B, have been generated. In this case, a user who has opened the document file 602 finds out that the division position is wrong and has to find the document file 601 that includes the first page of the document B in order to correct the document file 602. Searching for the document file 601 is troublesome to the user. In a case when the user does not remember the order in which the documents were scanned, searching for the document file 601 causes even more trouble for the user. Then, after finding the file, the user now has to correct the document files to have the document files as indicated by the dotted lines in FIG. 6A. To this end, the user first needs to divide the document file 601 using document file viewer software and then merge a document file including the last page of the document B, which has been produced by the division of the document file 601, with the document file 602. In this way, it is troublesome for the user.

Meanwhile, FIG. 6B is an example of document files generated not based on the division position between the last page of the document A and the first page of the document B, but based on an incorrectly determined division position between the second page of the document A and the last page of the document A.

[Document Division Correction Screen]

Figure 7:
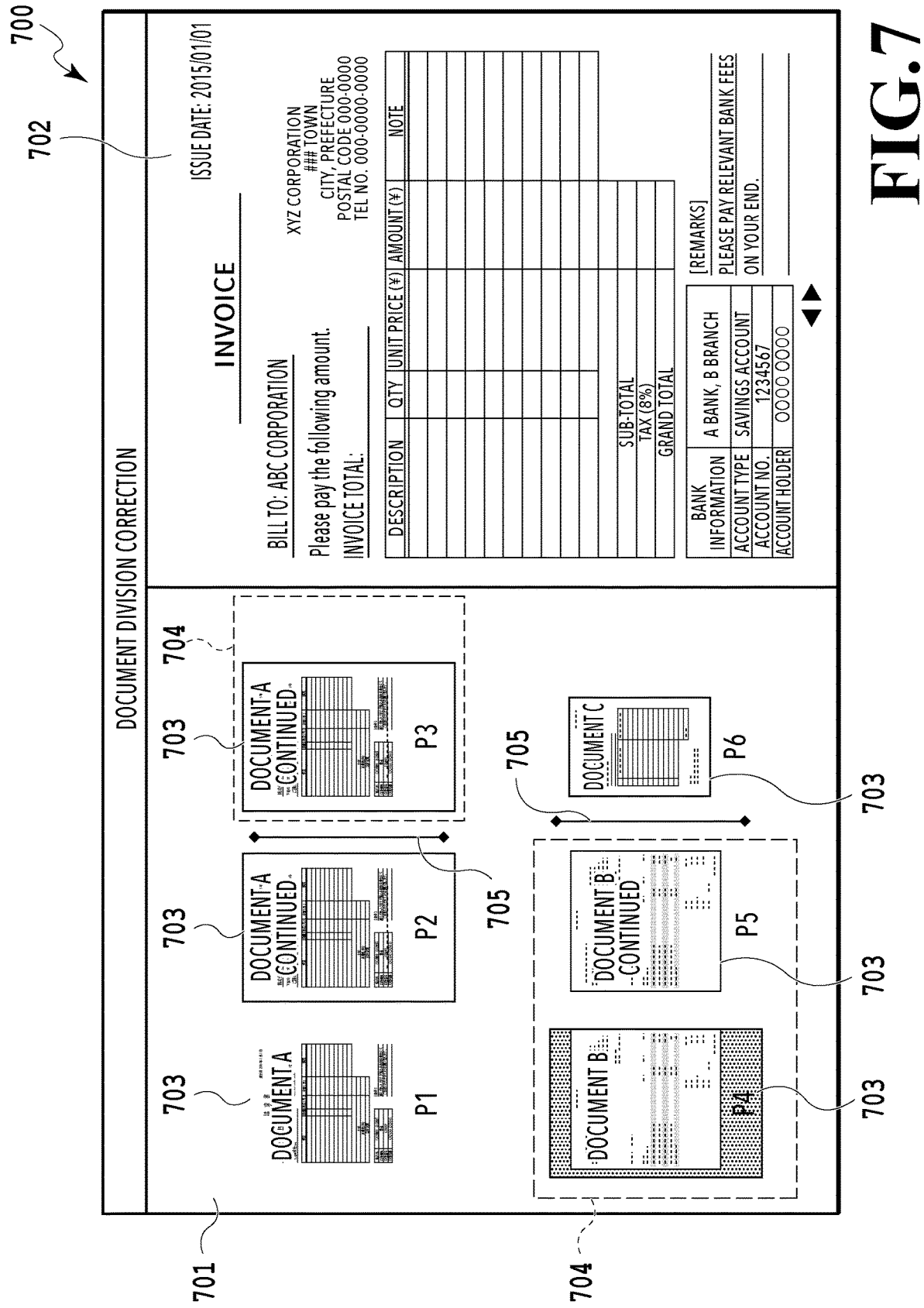
FIG. 7 is a diagram showing an example of a document division correction screen.

FIG. 7 is a diagram showing an example of a document division correction screen of the present embodiment displayed on the display unit of the client PC 110. A document division correction screen 700 in FIG. 7 is a screen displayed in a case when a user opens any of the document files managed by the document file saving unit 102 and then performs an operation for correcting the division position. The document file that was open in the event where the user instructs correction of the division position is called a correction-target document file.

Thumbnails 703 are displayed in a left region 701 of the document division correction screen 700, representing an undivided group of scan images corresponding to the correction-target document file. Specifically, the thumbnails 703 represent a group of scan images produced by collective scanning of a plurality of documents including the document corresponding to the correction-target document file. In the present embodiment, generated-document information (see FIG. 5B) is generated for each of the document files generated by division of a group of scan images produced by collective scanning of a plurality of documents. Using these pieces of generated-document information, the thumbnails 703 representing the group of scan images produced by scanning of the plurality of documents can be displayed in the order in which the documents were scanned. Being able to correct the correction-target document file using the document division correction screen 700, a user goes through less trouble finding the other document file to use for the correction.

Once one of the thumbnails 703 in the left region 701 is selected, the background of the selected thumbnail is displayed in gray. Then, the image of the page represented by the selected thumbnail is displayed in a magnified view in a right region 702 of the document division correction screen 700.

A mark 705 indicates the division position determined by the division position determination unit 312. By looking at the position of the mark 705, a user can check the incorrectly determined division position. A dotted-line frame 704 indicates that the thumbnails therein are pages included in the correction-target document file.

[Processing to Generate the Document Division Correction Screen]

Next, a description is given of processing for displaying the document division correction screen 700 in FIG. 7.

Figure 8:
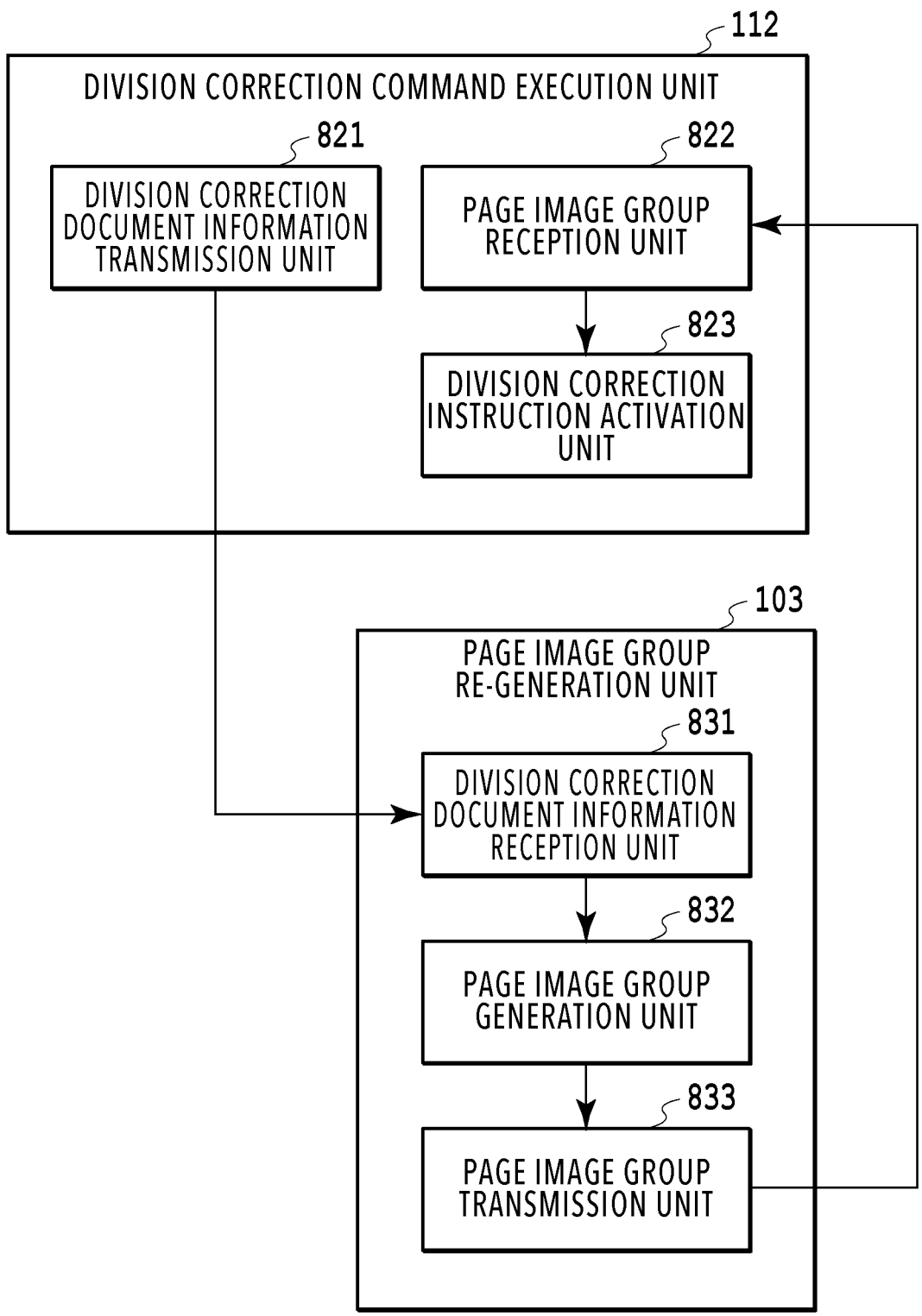
FIG. 8 is a block diagram showing details of the functions of a division correction command execution unit and a page image group re-generation unit.

FIG. 8 is a diagram illustrating details of the division correction command execution unit 112 of the client PC 110 and the page image group re-generation unit 103 of the information processing apparatus 100. The division correction command execution unit 112 has a division correction document information transmission unit 821, a page image group reception unit 822, and a division correction instruction activation unit 823.

A user selects one of the document files managed by the document file saving unit 102 of the information processing apparatus 100. In other words, the user accesses the document access information (file path) corresponding to the selected document file. The selected document file is thereby read, and then displayed by the document display unit 111 on the display apparatus of the client PC 110. Then, once the user finds out that the document file selected this time is a document file generated by division based on a wrong position, the user selects a division correction command displayed by the document display unit 111. The division correction command is a menu command stating, for example, "Correct the division position for this document."

Once the division correction command is selected, the division correction document information transmission unit 821 transmits information identifying the document file currently being displayed by the document display unit 111 (the correction-target document file) to the page image group re-generation unit 103 of the information processing apparatus 100. The information identifying the correction-target document file is transmitted via the network 130. Also, the information identifying the correction-target document file is document access information on (a file path to) the document file. The page image group reception unit 822 and the division correction instruction activation unit 823 will be described later.

The page image group re-generation unit 103 of the information processing apparatus 100 has a division correction document information reception unit 831, a page image group generation unit 832, and a page image group transmission unit 833.

The division correction document information reception unit 831 receives information identifying the correction-target document file transmitted from the division correction document information transmission unit 821 of the client PC 110. In other words, the division correction document information reception unit 831 receives document access information (a file path) for reading the correction-target document file.

Based on the document access information received by the division correction document information reception unit 831, the page image group generation unit 832 generates a group of page images and document division information to be described later that are used to display the thumbnails 703 of the document division correction screen 700 in FIG. 7. The group of page images generated by the page image group generation unit 832 corresponds to a group of scan images produced by scanning of a plurality of documents, which is before the correction-target document file is divided. Details of the page image group generation processing will be described later.

The page image group transmission unit 833 transmits the group of page images and the document division information generated by the page image group generation unit 832, back to the division correction command execution unit 112 of the client PC 110.

Figure 9:
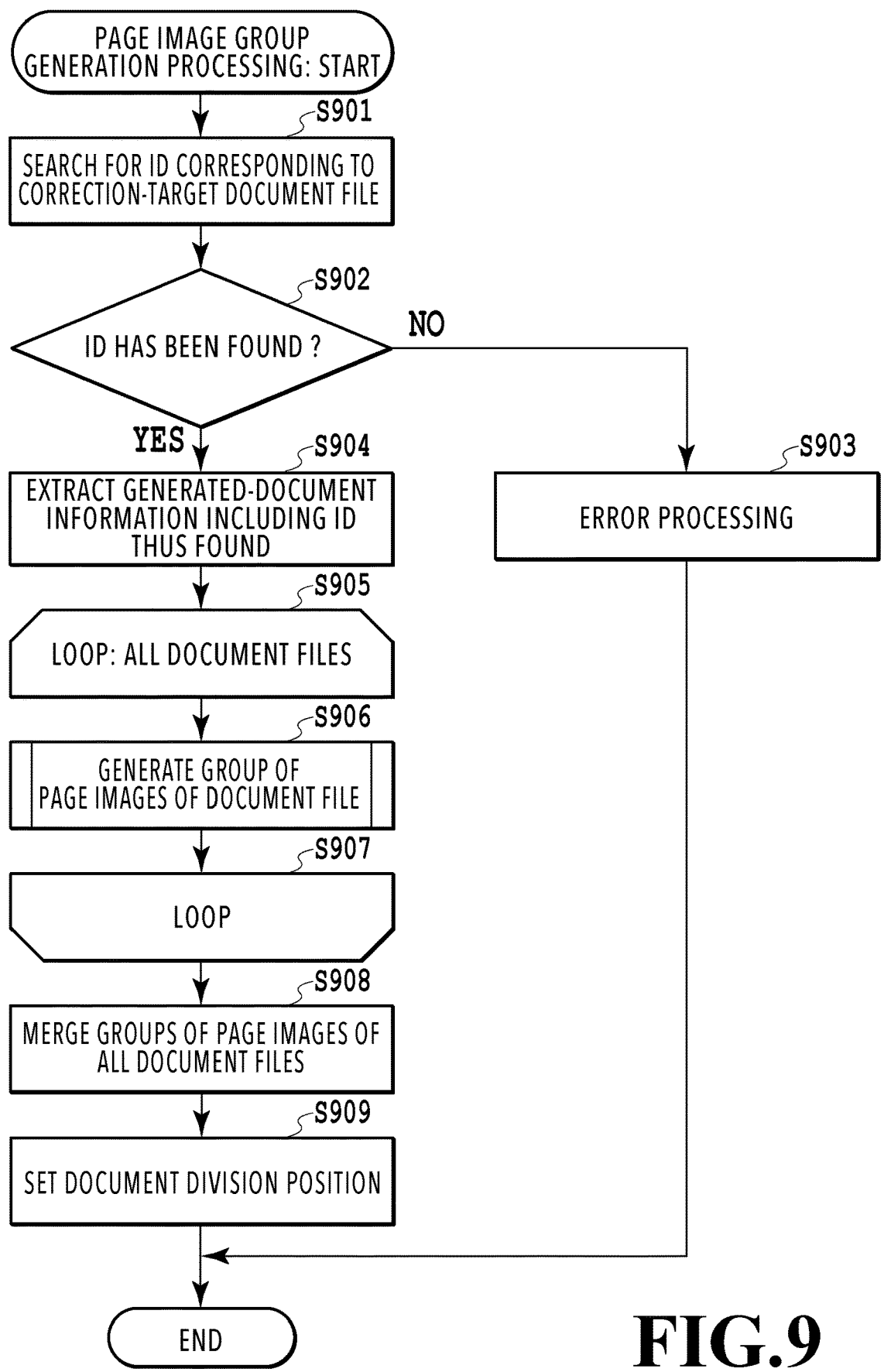
FIG. 9 is a flowchart of processing to generate a group of page images corresponding to a group of scan images.

FIG. 9 is a flowchart of the page image group generation processing performed by the page image group generation unit 832 of the information processing apparatus 100.

In S901, the page image group generation unit 832 obtains document access information transmitted from the division correction document information transmission unit 821 and received by the division correction document information reception unit 831, the document access information being information identifying a correction-target document file. Then, using the obtained document access information as a search key, the page image group generation unit 832 searches the ROM 203 or the storage apparatus 205 of the information processing apparatus 100 where pieces of generated-document information on the document files described with FIG. 5B are saved as a log. Then, in a case when generated-document information holding the same document access information as the document access information received by the division correction document information reception unit 831 is found, the latest division job ID included in the generated-document information thus found is obtained.

In S902, the page image group generation unit 832 determines whether the division job ID of the generated-document information holding the same document access information as the document access information received by the division correction document information reception unit 831 has been successfully obtained.

If it is determined that the division job ID was not successfully obtained (NO in S902), the processing proceeds to S903 where the page image group generation unit 832 performs error processing, and the flowchart ends.

If it is determined that the division job ID was successfully obtained (YES in S902), in S904, the page image group generation unit 832 extracts all of the pieces of generated-document information including the division job ID obtained in S901. For example, in a case when a division job ID "20211012_001" is obtained as a result of the processing in S901 and the pieces of generated document information in FIG. 5B are saved as a log, the pieces of generated-document information held in the rows 504 to 506 of the table in FIG. 5B are extracted in S904.

The next steps, S905 to S907, are processing performed in a loop. In S905, the page image group generation unit 832 selects one of all the pieces of generated-document information extracted in S904 as a processing target. For example, in a case when the pieces of generated-document information held in the rows 504 to 506 in FIG. 5B are extracted in S904, one of the pieces of generated-document information held in the rows 504 to 506 is selected as a processing target. Then, processing in S906 is executed on the processing-target generated-document information.

Then, in S907, the page image group generation unit 832 determines whether all the pieces of generated-document information extracted in S904 have been processed. If not all the pieces of generated-document information extracted in S904 have been processed, the processing returns to S905, and the next processing target is selected from the unprocessed pieces of generated-document information.

In S906, processing is performed to generate a group of page images in which images, in units of pages, forming the document file corresponding to the processing-target generated-document information are collated in the order of page numbers.

Figure 10:
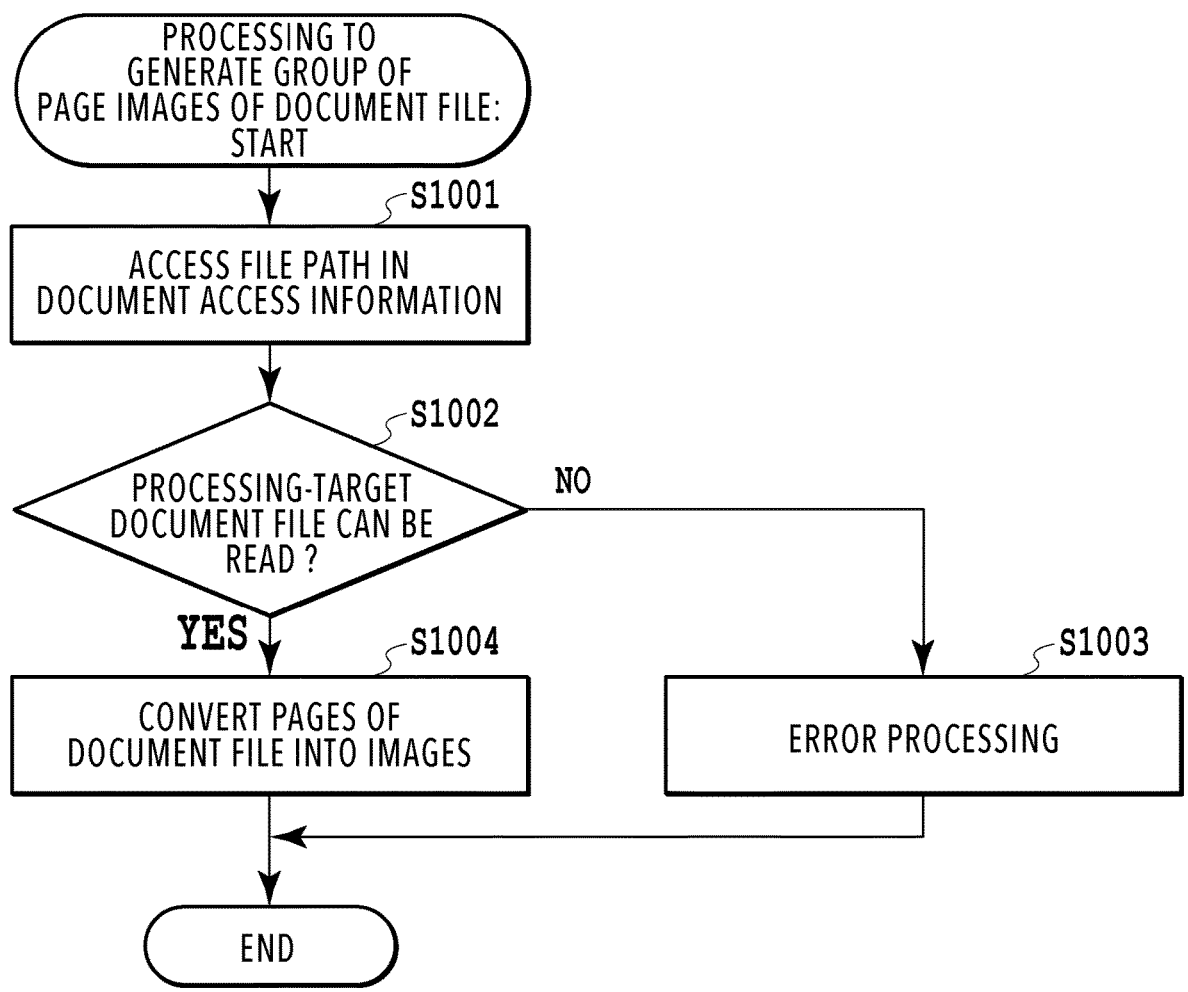
FIG. 10 is a flowchart of processing to generate a group of page images of a document file.

FIG. 10 is a flowchart illustrating the details of the processing performed in S906 to generate a group of page images of a document file.

In S1001, the page image group generation unit 832 obtains the document access information included in the processing-target generated-document information. For example, in a case when the processing-target generated-document information is the information on the row 504 in FIG. 5B, "¥¥server01¥20211012¥001¥file." obtained.

In S1002, the page image group generation unit 832 determines whether the document file can be read by access to the file path indicated by the document access information obtained in S1001. If it is determined that the document file cannot be read (NO in S1002), in S1003, the page image group generation unit 832 performs error processing, and the processing of the flowcharts in FIGS. 10 and 9 end.

Meanwhile, if the document file was successfully read (YES in S1002), the processing proceeds to S1004. In S1004, the page image group generation unit 832 converts the pages included in the document file read by access to the document access information into images in units of pages and generates a group of page images of the document file corresponding to the processing-target generated-document information.

Referring back to FIG. 9, the description of the flowchart in FIG. 9 is continued. If it is determined in S907 that the processing in S906 has been completed on all the pieces of generated-document information extracted in S904, the processing proceeds to S908. More specifically, if a group of page images has been generated for all the document files having the same division job ID as the correction-target document file for which the user instructs correction, the processing proceeds to S908.

In S908, the page image group generation unit 832 merges the groups of page images generated by the loop processing in S905 to S907 according to the order indicated by the "document ordinal position information" included in each piece of generated-document information obtained in S904.

In S909, the page image group generation unit 832 generates "document division information" by adding a division position to the generated-document information obtained in S904, the division position having been determined by the division position determination unit 312 for the group of page images. Then, the flowchart in FIG. 9 ends.

Figures 11A, 11B:
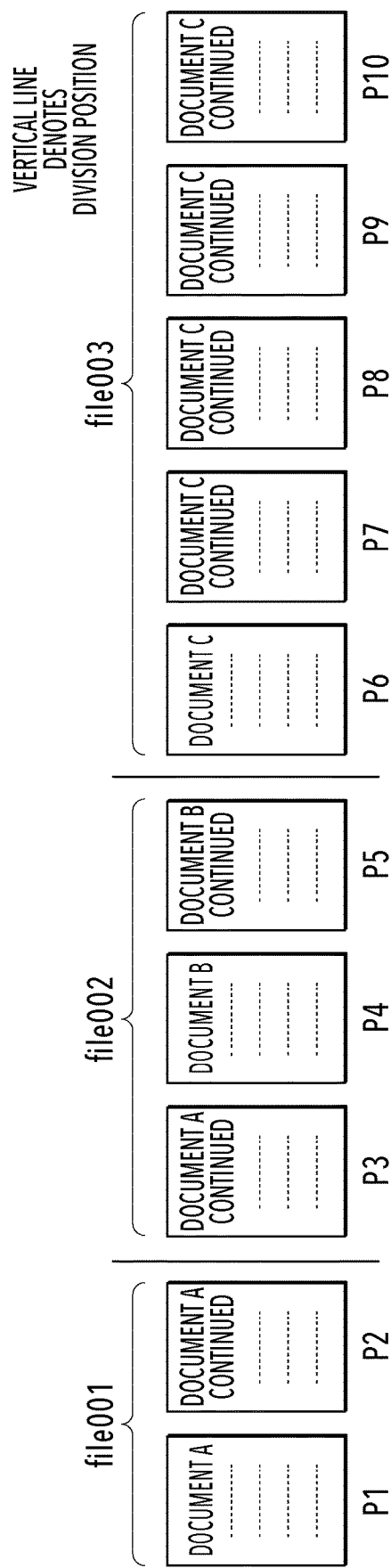
FIGS. 11A and 11B are diagrams showing an example of a group of page images corresponding to a group of scan images and a diagram showing an example of document division information.

FIG. 11A is a diagram showing a group of page images for the document files assigned with the same division job ID, generated by the page image group generation unit 832 by executing the flowchart in FIG. 9. Here, it is assumed that the correction-target document file for which a user instructs correction is "file002." Documents identified in this case are the document scanned to generate "file002" and the other document files "file001" and "file003" generated from the group of scan images produced by collective scanning of a plurality of documents including the document scanned to generate "file002." Then, a group of page images is generated for each of "file001," "file002," and "file003," and those groups of page images are merged together according to the document ordinal position information. In this way, the page image group generation unit 832 generates a group of page images forming the same structure as the group of scan images generated by scanning of a plurality of documents.

FIG. 11B is a diagram showing an example of a table of pieces of "document division information" on the respective document files assigned with the same division job ID, generated by the page image group generation unit 832 by executing the flowchart in FIG. 9. The table in FIG. 11B has a similar structure to the table in FIG. 5B, and each of rows 1106 to 1108 holds "document division information" on a single case (a single document file). Also, as shown in columns 1101 to 1103, the "document division information" includes "division job ID," "document ordinal position information," and "document access information" like the generated-document information in FIG. 5B. The "document division information" is the "generated-document information" plus "division position" and "correction target."

A column 1104 of the table in FIG. 11B holds "division position" assigned to a document file. A "division position" is the page number of the last page of a document file in a group of page images. For example, in a case when a group of page images of a total of ten pages is generated as shown in FIG. 11A, the last page of "file001" is the second page in the group of page images, the last page of "file002" is the fifth page of the group of page images, and the last page of "file003" is the tenth page of the group of page images. In this case, "2," "5," and "10" are held as the "division positions" for the document files "file001," "file002," and "file003," respectively.

A column 1105 of the table in FIG. 11B holds "correction target" for each document file. A number "1" is held for a correction-target document file transmitted from the division correction command execution unit 112, and "0" is held for other document files.

Referring back to FIG. 8, the description is continued for the details of the division correction command execution unit 112, which is a functional unit of the client PC 110 to generate the document division correction screen 700 in FIG. 7.

From the page image group transmission unit 833 of the information processing apparatus 100, the page image group reception unit 822 receives the group of page images in FIG. 11A and the pieces of document division information in FIG. 11B generated by the page image group generation unit 832 of the information processing apparatus 100.

The division correction instruction activation unit 823 activates the division correction instruction unit 113 to perform initial display of the group of page images received by the page image group reception unit 822.

Figure 12:
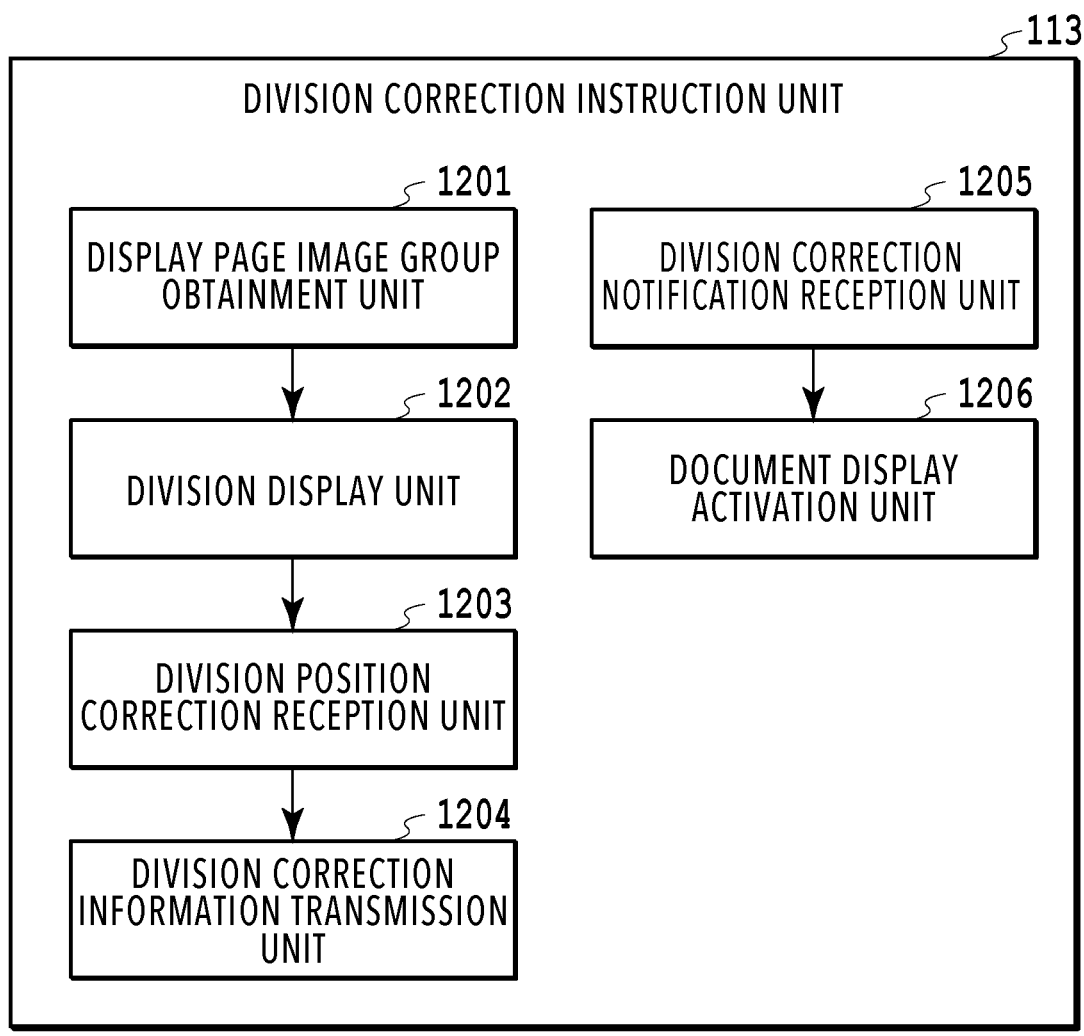
FIG. 12 is a block diagram showing details of the functions of a division correction instruction unit.

FIG. 12 is a detailed functional block diagram of the division correction instruction unit 113 included in the client PC 110.

A display page image group obtainment unit 1201 obtains the group of page images and the document division information set to be displayed first upon activation. Specifically, the display page image group obtainment unit 1201 obtains the group of page images in FIG. 11A and the document division information in FIG. 11B generated by the page image group generation unit 832.

A division display unit 1202 displays the above-described document division correction screen 700 in FIG. 7 on the display apparatus based on the group of page images and the document division information obtained by the display page image group obtainment unit 1201. Specifically, the division display unit 1202 displays the thumbnails 703 based on the group of page images in FIG. 11A obtained. The division display unit 1202 can display the mark 705 indicating a division position based on the "division position" in the document division information in FIG. 11B. The division display unit 1202 can display the dotted-line frame 704 based on the "correction target" in the document division information in FIG. 11B. In this way, even in a case when the document files generated from a group of scan images obtained by collective scanning of a plurality of documents are saved in different scattered locations in the information processing apparatus 100, thumbnails of the group of page images can be displayed together in such a manner as to correspond to the group of scan images.

[Document File Correction Processing]

A user can correct a division position (break) via the document division correction screen 700 in FIG. 7. Processing performed to correct a document file based on a division position corrected by a user is described next.

A user who sees on the document division correction screen 700 in FIG. 7 that a division position has been incorrectly determined can instruct to correct the division position by operating a mouse, or the like. For example, in a case when a division position is at an unnecessary location, a user can instruct to delete the division position by deleting the mark 705 indicating that division position. In a case when there are not enough division positions to break the documents, a user can instruct to add a division position by adding a mark 705 to a correct location. In a case when a division position is mispositioned, a user can instruct to move the division position by moving the mark 705 to a correct location.

Referring back to FIG. 12, the description is continued for the division correction instruction unit 113 included in the client PC 110. A division position correction reception unit 1203 receives the content of division position correction that a user has instructed via the document division correction screen 700 in FIG. 7. The division position correction reception unit 1203 then generates "division correction information" indicating the content of the division position correction. For example, upon receipt of a user operation of confirming correction, the division position correction reception unit 1203 generates the "division correction information" as of the point of the confirmation.

Figures 13A, 13B:
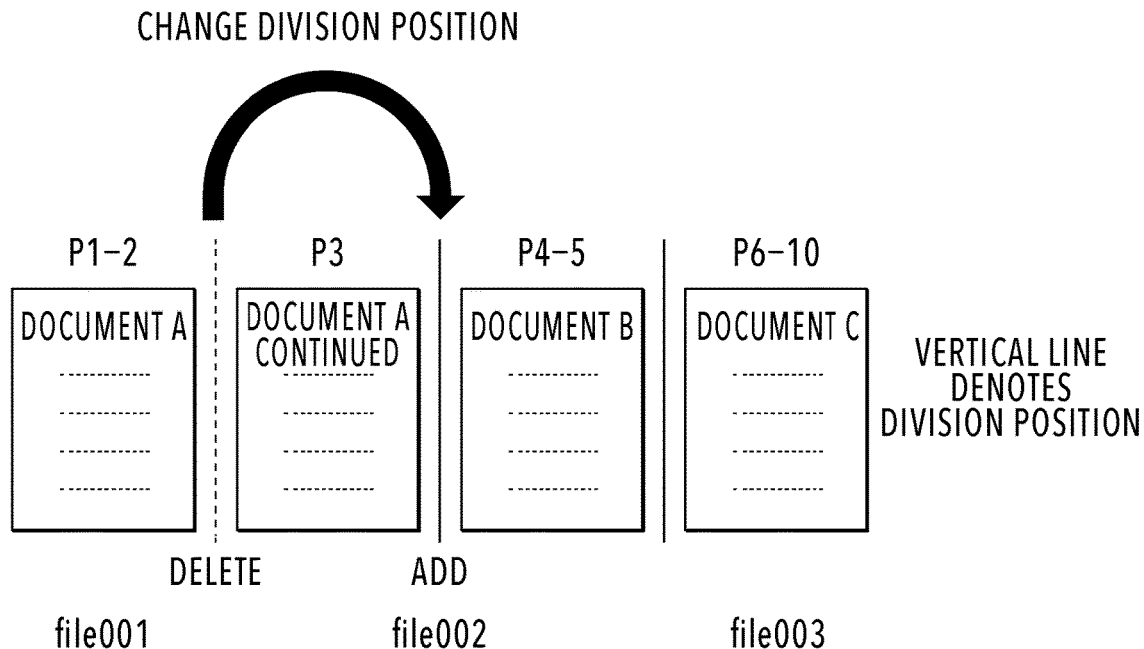
FIGS. 13A and 13B are diagrams showing an example of correction of a division position and a diagram showing an example of division correction information.

FIG. 13A is a diagram schematically showing the content of division position correction instructed by a user via the document division correction screen 700 in FIG. 7. Here it is assumed that the user instructs correction via the document division correction screen 700 in FIG. 7 so that the division position determined by the division position determination unit 312 between the second page and the third page of the group of page images may be moved to a location between the third page and the fourth page of the group of page images. Moving a division position is equivalent to a combination of deleting the division position and adding a division position. Thus, the division position correction reception unit 1203 creates "division correction information" having any of add, delete, and a combination of add and delete as the content of division position correction. In a case of receiving an instruction to move the division position between the second page and the third page to a location between the third page and the fourth page, first, the division position between the second page and the third page is deleted, and, then, a division position is added to the location between the third page and the fourth page. Thus, the correction content is broken up into two pieces of "division correction information."

FIG. 13B is a diagram showing an example of a table of pieces of "division correction information." A single piece of "division correction information" is generated for every addition of a division position or deletion of a division position. Each of rows 1306 to 1307 of the table in FIG. 13B holds a single piece of "division correction information." FIG. 13B shows an example of "division correction information" corresponding to the division position correction instruction shown in FIG. 13A. "Division correction information" is information indicating what type of division position correction is to be made to the uncorrected division position.

A column 1302 holds document ordinal position information on a document file subjected to deletion or addition of a division position, the ordinal position information indicating an ordinal position in the group of page images and obtained from the column 1102 of "document division information" in FIG. 11B.

A column 1303 holds "correction type," which is either "delete" or "add." A column 1304 holds "division position," which is the value of the page number of the former one of the pages that are before and after the division position instructed to be subjected to the correction held in "correction type" in the column 1303. The page number here is a page number in the group of page images corresponding to the group of scan images generated by the page image group generation unit 832.

In FIG. 13B, the division correction information on a row 1306 holds "delete" as "correction type" and "2" as "division position." The content of correction held in this row, therefore, means that the division position between the second page and the third page in the group of page images generated by the page image group generation unit 832 is deleted. The division correction information on a row 1307 holds "add" as the "correction type" and "3" as the "division position." The content of correction held in this row, therefore, means that a division position is added between the third page and the fourth page in the group of page images generated by the page image group generation unit 832.

A column 1301 in FIG. 13B holds the value held in the column 1101 of "document division information" in FIG. 11B. A column 1305 in FIG. 13B holds the value held in the column 1105 of "document division information" in FIG. 11B.

Referring back to FIG. 12, the description is continued for the division correction instruction unit 113 included in the client PC 110. A division correction information transmission unit 1204 transmits, to the information processing apparatus 100, the "division correction information" in FIG. 13B as of the point of confirmation generated by the division position correction reception unit 1203. A division correction notification reception unit 1205 and a document display activation unit 1206 will be described later.

Referring back to FIG. 3, a detailed function of the division correction unit 320 of the information processing apparatus 100 is described. The division correction unit 320 has a division correction information reception unit 321, a division position correction unit 322, and a division correction notification unit 323.

The division correction information reception unit 321 receives the "division correction information" in FIG. 13B transmitted from the division correction information transmission unit 1204 of the client PC 110.

The division position correction unit 322 divides and merges document files managed by the document file saving unit 102 based on the "division correction information" in FIG. 13B received. The division position correction unit 322 corrects the document files so that the document files generated may be document files divided from the original group of scan images based on a user-instructed division position.

Figure 14:
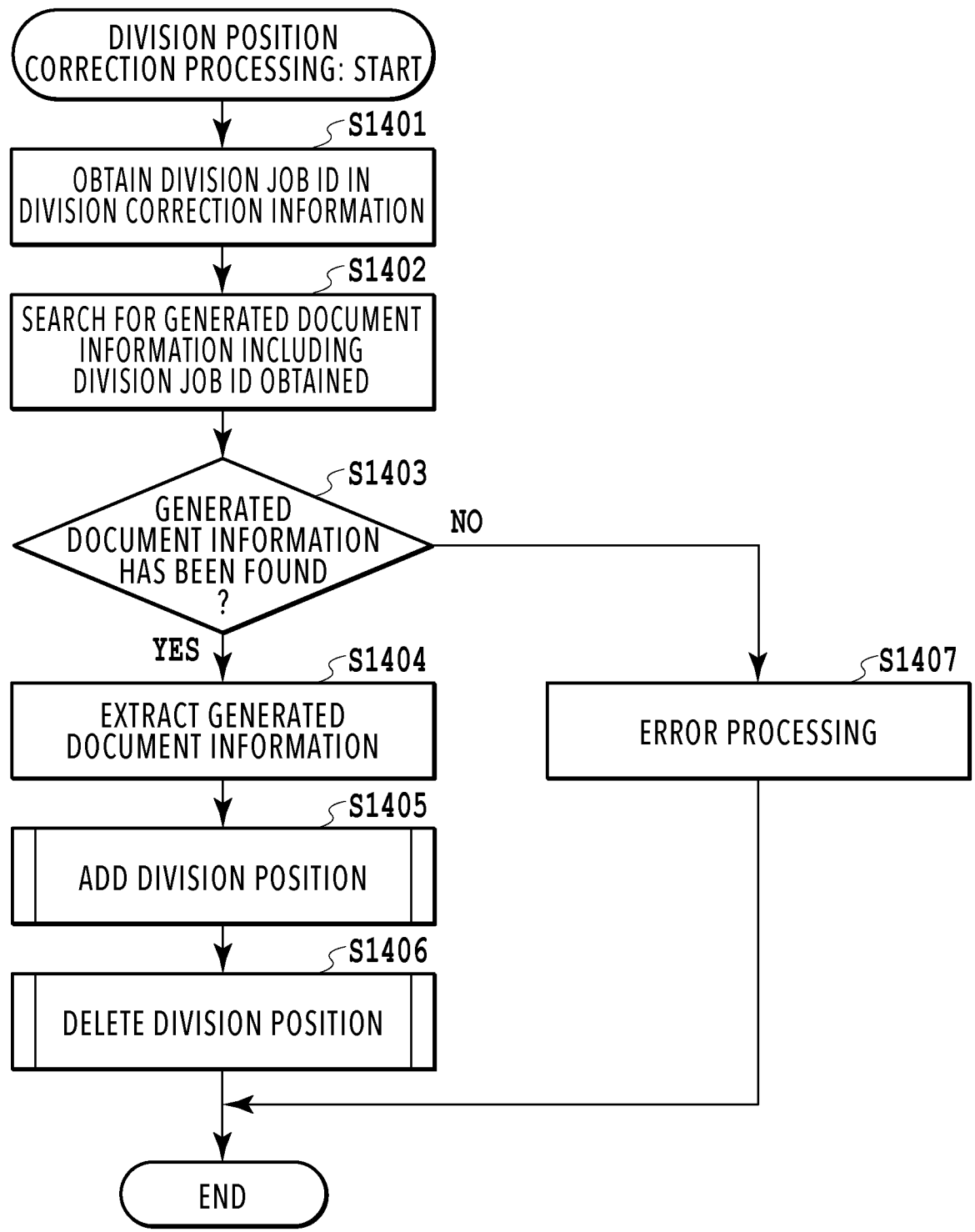
FIG. 14 is a flowchart of division correction processing.

FIG. 14 is a flowchart illustrating document file correction processing performed by the division position correction unit 322. The processing performed by the division position correction unit 322 is described in detail using FIG. 14.

In S1401, the division position correction unit 322 obtains a division job ID included in "division correction information" in FIG. 13B received by the division correction information reception unit 321.

In S1402, the division position correction unit 322 uses the obtained division job ID as a search key to search the ROM 203 or the storage apparatus 205 of the information processing apparatus 100 in which the "generated-document information" described using FIG. 5B is saved as a log.

In S1403, the division position correction unit 322 determines whether "generated-document information" including the same division job ID as the division job ID included in the "division correction information" has been successfully found. If it is determined that such "generation document information" cannot be found (NO in S1403), the processing proceeds to S1407 to perform error processing and end the processing.

If "generated-document information" including the same division job ID as the division job ID included in the "division correction information" has been successfully found (YES in S1403), the processing proceeds to S1404. In S1404, the division position correction unit 322 extracts all the pieces of "generated-document information" including the same division job ID as the division job ID included in the "division correction information." As an example, it is assumed that the division job ID included in the division correction information is "20211012_001" like in FIG. 13B and that the generated-document information in FIG. 5B is saved as a log. In this case, in S1404, the pieces of "generated-document information" held in the rows 504 to 506 of the table in FIG. 5B are extracted.

In S1405, the division position correction unit 322 performs division position addition processing.

Figure 15:
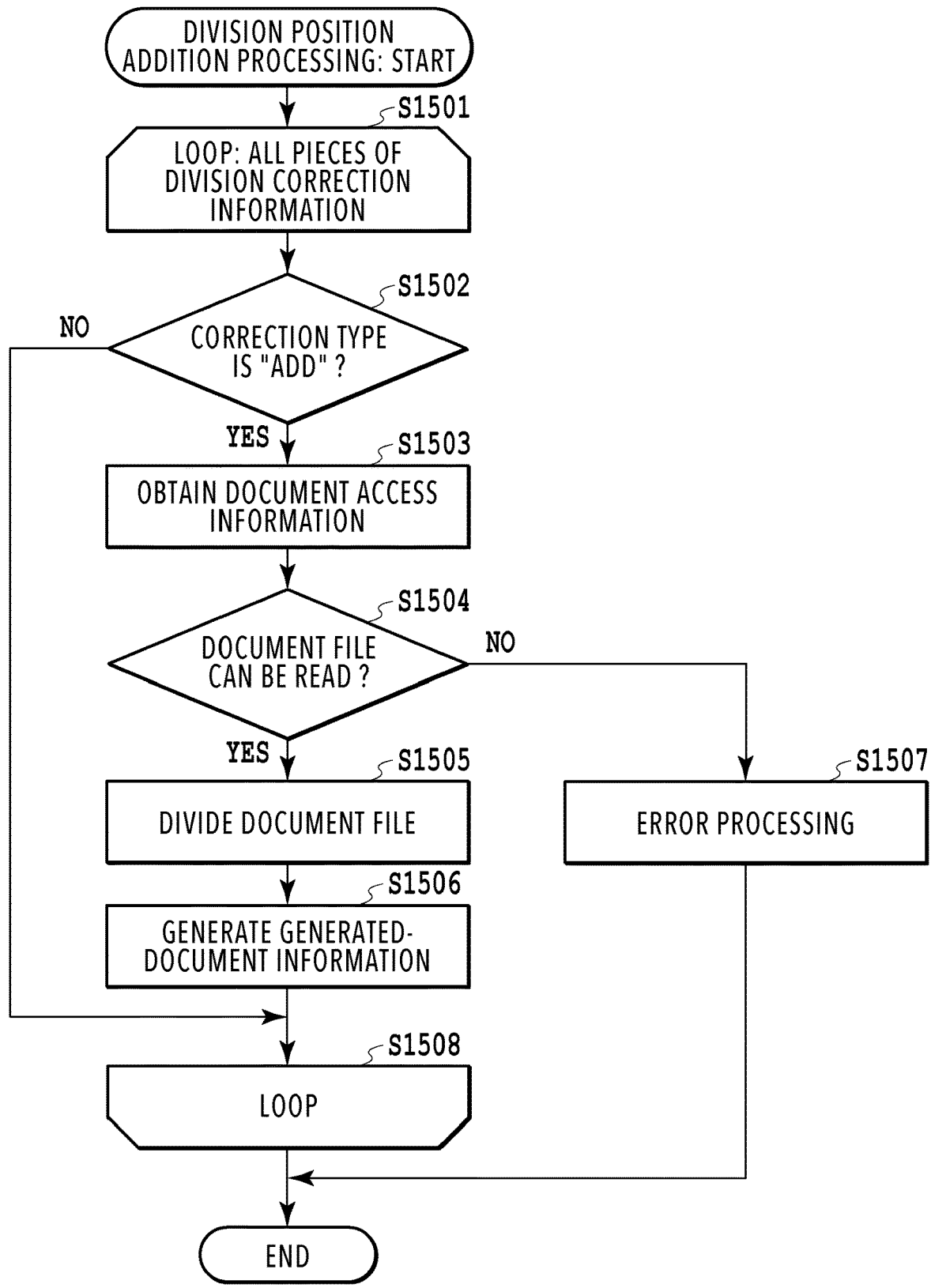
FIG. 15 is a flowchart of division position addition processing.

FIG. 15 is a flowchart of details of the division position addition processing executed in S1405.

The processing in S1405 is described in detail using FIG. 15.

S1501 to S1508 are processing performed in a loop. In S1501, the division position correction unit 322 selects processing-target "division correction information" from the pieces of "division correction information" received by the division correction information reception unit 321. For example, in a case when the division correction information reception unit 321 receives the pieces of "division correction information" held in the rows 1306 and 1307 in FIG. 13B, one of the pieces of "division correction information" held in the rows 1306 and 1307 in FIG. 13B is selected as a processing target. Then, the processing in S1502 to S1506 is executed on the processing-target "division correction information." The top row is selected first as a processing target.

Then, in S1508, the division position correction unit 322 determines whether all the pieces of "division correction information" received by the division correction information reception unit 321 have been processed. If not all the pieces of "division correction information" received have been processed, the processing proceeds back to S1501, and the next processing target is selected from the unprocessed pieces of "division correction information."

In S1502, the division position correction unit 322 determines whether the correction type included in the processing-target "division correction information" is "add." If the correction type is not "add," the loop processing on the current processing-target "division correction information" ends, and the processing proceeds to S1508. If the correction type is "add," the processing proceeds to S1503. Specifically, in the case of the table in FIG. 13B, the processing proceeds to S1508 if the row 1306 is the current processing target and proceeds to S1503 if the row 1307 is the current processing target.

In S1503, the division position correction unit 322 obtains the value of document ordinal position information held in the processing-target "division correction information." Then, from the pieces of "generated-document information" obtained in S1404, the division position correction unit 322 extracts one of the pieces of "generated-document information" that is holding document ordinal position information with the same value as the value of the document ordinal position information obtained above. Then, the division position correction unit 322 obtains the document access information included in the one of the pieces of "generated-document information" thus extracted. For example, in a case when the row 1307 in FIG. 13B is the current processing target, "2" is obtained as the value of the document ordinal position information. Then, in a case when the pieces of "generated-document information" obtained in S1404 are the rows 504 to 506 of the table in FIG. 5B, "2" is held as the document ordinal position information in the "generated-document information" on the row 505 of the table in FIG. 5B. Thus, "¥¥server01¥20211012¥001¥file002.pdf," which is the document access information on the row 505 of the table in FIG. 5B, is obtained.

In S1504, the division position correction unit 322 determines whether the document file can be read by access to the file path indicated by the document access information obtained in S1503. If it is determined that the document file cannot be read (NO in S1504), the division position correction unit 322 performs error processing in S1507, gets out of the loop processing, and ends the processing of this flowchart. In this case, error processing is performed in the flowchart in FIG. 14 as well, and the processing ends.

If it is determined that the document file can be read (YES in S1504), in S1505 the division position correction unit 322 divides the read document file according to the division position included in the "division correction information" of the current processing target. For example, in a case when the row 1307 in FIG. 13B is the current processing target, "3" indicative of the third page is held as the division position. Also, it is assumed here that the document file read by access to the document access information obtained in S1503 is the document file corresponding to the generated-document information on the row 505 of the table in FIG. 5B. In this case, the division position "3" corresponds to the first page of the document file read. Thus, the division position correction unit 322 makes a division by setting a division position at a location between the first page and the second page of the document file read by access to the document access information obtained in S1503. Document files produced by the division are saved in the storage unit by the document file saving unit 102. A division position is thus added.

The division position correction unit 322 gives each of the document files produced by the division a file name different from any of the existing document files. In the present embodiment, a file name given has "-N" (where N is the smallest numeral value that is not the same as the existing files) added to a non-extension part of the original file name. Alternatively, the file name may be generated by extracting a character string indicative of the content of the document from the text information on the document file and combining them according to a predetermined rule.

In S1506, the generated-document information management unit 330 generates "generated-document information correction results" produced by reflecting the results of the division position addition processing in the "generated-document information" extracted in S1404.

If it is determined in S1508 that the processing in S1502 to S1506 has been completed on all the pieces of "division correction information" received by the division correction information reception unit 321, the processing in the flowchart in FIG. 15 ends.

FIG. 17A shows document files corrected as a result of the division position addition processing performed on the document file in FIG. 5A using the "division correction information" in FIG. 13B.

The table in FIG. 17B is an example of "generated-document information correction results" generated by division position addition processing performed on each of the pieces of "generated-document information" on the rows 504 to 506 of the table in FIG. 5B according to the "division correction information" on the row 1307 in FIG. 13B. In the "generated-document information correction results," the "generated-document information" additionally has a column 1704 for holding "correction target." In the "correction target," "1" is held for the correction-target document file, and "0" is held for other document files.

In FIG. 17B, the row with document ordinal position information "2" is divided into two rows as a result of the division position addition processing. Also, although "1" was held as "correction target" on the row with the document ordinal position information "2," after the correction-target document file is divided, "0" indicative of a non-target of correction is held as the correction target for documents other than a single document meeting a predetermined rule. In FIG. 17B, the latter one of the divided document files is set a correction-target document file.

The description of the flowchart in FIG. 14 is continued. After S1405, the processing proceeds to S1406. In S1406, the division position correction unit 322 performs division position deletion processing.

Figure 16:
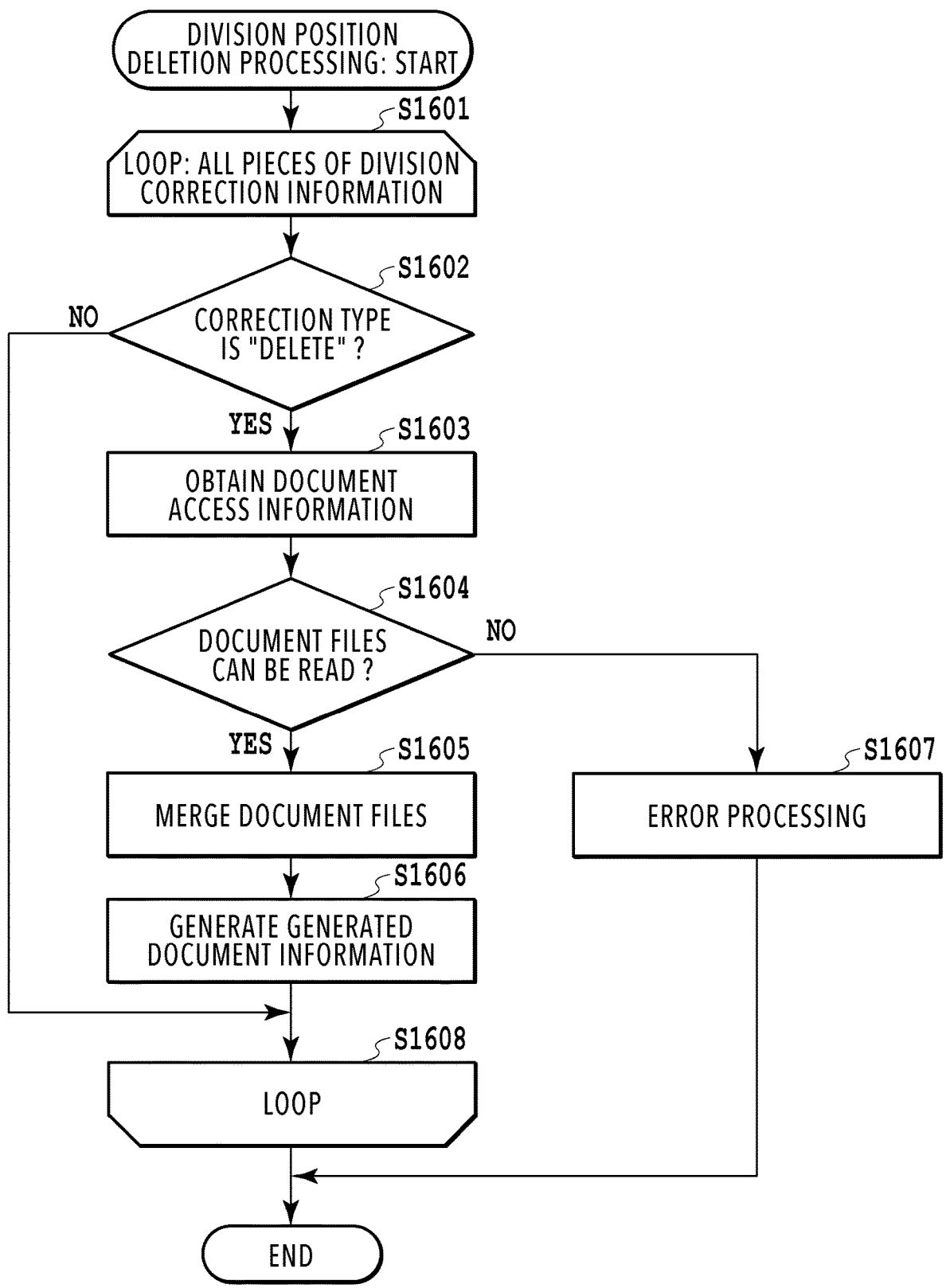
FIG. 16 is a flowchart of division position deletion processing.

FIG. 16 is a detailed flowchart of the division position deletion processing. The processing in S1406 is described in detail using FIG. 16.

S1601 to S1608 are processing performed in a loop. In S1601, the division position correction unit 322 selects, as a correction target, one of the pieces of "division correction information" received by the division correction information reception unit 321. Then, the processing in S1602 to S1606 is executed on the processing-target "division correction information." The processing target is selected from the top row down.

Then, in S1608, the division position correction unit 322 determines whether all the pieces of "division correction information" received by the division correction information reception unit 321 have been processed. If not all the pieces of "division correction information" have been processed, the processing proceeds back to S1601 to select the next processing target from the unprocessed pieces of division correction information.

In S1602, the division position correction unit 322 determines whether the correction type included in the processing-target "division correction information" is "delete." If the correction type is not "delete," the loop processing on the "division correction information" of the current processing target is ended, and the processing proceeds to S1608. If the correction type is "delete," the processing proceeds to S1603. Specifically, in the case of the table in FIG. 13B, the processing proceeds to S1603 if the row 1306 is the current processing target and proceeds to S1608 if the row 1307 is the current processing target.

In S1603, the division position correction unit 322 obtains the value of the document ordinal position information included in the processing-target "division correction information." Then, from the pieces of "generated-document information" obtained in S1404, the division position correction unit 322 extracts one of the pieces of "generated-document information" that is holding document ordinal position information with the same value as the value of the document ordinal position information obtained. The division position correction unit 322 also extracts the "generated-document information" on the next row below the extracted "generated-document information." Note that, in a case when the "generated-document information correction results" have been generated by the division position addition processing in previous S1405, the target information is extracted from the "generated-document information correction results."

For example, in a case when the row 1306 in FIG. 13B is the "division correction information" of the current processing target, "1" is obtained as the value of the document ordinal position information. Then, in a case when the rows 1705 to 1708 of the table in FIG. 17B hold the "generated-document information correction results" reflecting the results of the addition processing, "1" is held as the document ordinal position information on the row 1705 of the table in FIG. 17B. Thus, document access information on the row 1705 and one on the next row 1706 of the table in FIG. 17B are obtained.

Specifically, "¥¥server01¥20211012¥001¥file." and "¥¥server01¥20211012¥001¥file002-1.pdf" are obtained as the document access information.

In S1604, the division position correction unit 322 determines whether the two document files can be read by access to the file paths indicated by the document access information obtained in S1603. If it is determined that at least one of the document files cannot be read (NO in S1604), the division position correction unit 322 performs error processing in S1607, gets out of the loop processing, and ends the processing in this flowchart. In this case, the error processing is performed in the flowchart in FIG. 14 as well, and the processing ends.

If it is determined that the two document files can be read (YES in S1604), in S1605, the division position correction unit 322 merges the two document files thus read. The merged document file is saved in the storage unit by the document file saving unit 102. The division position is thus deleted.

The division position correction unit 322 gives the merged document file a file name different from any of the existing document files. In the present embodiment, a file name given has "-N" added to a non-extension part of the file name of one of the document files merged together, which has the smaller value as the document ordinal position information. "N" is the smallest numeral value that is not the same as the existing files.

In S1606, the generated-document information management unit 330 reflects the results of the division position deletion processing in the "generated-document information correction results."

If it is determined in S1608 that the processing in S1602 to S1606 has been completed on all the pieces of "division correction information" received by the division correction information reception unit 321, the processing in the flowchart in FIG. 16 is ended.

FIG. 17C shows document files corrected as a result of division position deletion processing performed on the document files in FIG. 17A by using the "division correction information" in FIG. 13B.

The table in FIG. 17D is an example of "generated-document information correction results" obtained by reflecting the results of the deletion processing in the "generated-document information correction results" held in the rows 1705 to 1708 of the table in FIG. 17B. In FIG. 17B, the row 1706 that is under the row having document ordinal position information "1" has been deleted as a result of the division position deletion processing. Note that, in a case when a document file with correction target "1" and a document file with correction target "0" are merged, a document produced by the merge has correction target "1."

Once the flowchart in FIG. 14 ends, the generated-document information management unit 330 deletes the column 1704 holding the correction target from the "generated-document information correction results" in FIG. 17D generated as a result of the division position correction processing. Also, in a case when the values in the document ordinal position information in the column 1702 are not consecutive, the generated-document information management unit 330 replaces the values so that they may be consecutive. Then, the generated-document information management unit 330 replaces the value of the division job ID held in the column 1701 of the "generated-document information correction results" with a new ID value. The generated-document information management unit 330 thus generates the new "generated-document information" and adds and saves the generated "generated-document information" in the ROM 203 or the storage apparatus 205 of the information processing apparatus 100 as part of a log.

The "generated-document information" newly generated includes not only the "generated-document information" on the document file newly generated by the division position correction, like the rows 1705, 1707 in FIG. 17D, but also, the "generated-document information" on the document files not corrected, like the row 1708. Thus, generated-document information on every single one of the documents generated from the same bundle of paper documents can be extracted in the generated-document information extraction processing (S904) performed by the page image group generation unit 832.

The description of the division correction unit 320 of the information processing apparatus 100 is continued using FIG. 3. The division correction notification unit 323 notifies the division correction instruction unit 113 of the client PC 110 of the document access information for reading the corrected document file generated by the division position correction unit 322.

Referring back to FIG. 12, the description of the division correction instruction unit 113 included in the client PC 110 is continued. The division correction notification reception unit 1205 receives the document access information for reading the corrected document file transmitted from the information processing apparatus 100. Then, the division correction notification reception unit 1205 accesses the file path indicated by the document access information received and receives the new document file corresponding to the correction-target document file.

The document display activation unit 1206 activates the document display unit 111 to display the document file received by the division correction notification reception unit 1205.

In the present embodiment described above, in the event when a division position between document files generated by a document division function is to be corrected, it is less troublesome to find a document file including a page to be included in the same document. Also, according to the present embodiment, to correct a division position, a user only needs to select a correction-target document file and to instruct correction of the division position. Thus, less trouble is caused for the user in dividing and merging document files.

Modification 1

In the above description, after document files in units of documents are generated from a group of scan images obtained by scanning of a plurality of documents, the document files are saved in document file storage locations in the storage unit inside the information processing apparatus 100, which is a typical file server. Also, in the above description, the document access information included in the generated-document information is not updated. Thus, in a case when the user or system changes the storage locations or file names of all or some of the document files, the page image group generation unit 832 cannot read the document files. Specifically, it is determined "NO" in S1002 in the flowchart in FIG. 10, the group of page images cannot be re-generated, and the document division correction screen 700 in FIG. 7 cannot be displayed. Thus, in the method described above, in a case when the storage location or file name of a document file is changed, a user cannot instruct correction of the division position.

Thus, a document management system where a file can be accessed using a document identifier, not dependent on a file name or a storage folder, may be used as the storage location of a document file. In this case, a document identifier may be saved as the document access information in the "generated-document information" in FIG. 5B.

As an example of the document management system where a file can be accessed using a document identifier, there is a method involving using a document management DB. The document management DB manages document attributes for each document file, such as a document name, a file name, a storage location, a creator, an editor, and a document identifier, and a document file is searched for based on these pieces of information.

Thus, this modification makes it possible to re-generate a group of page images even in a case when the storage locations or file names of document files generated by division of a group of scan images are changed.

Modification 2

In the method described above, a file path indicated by the document access information in "generated-document information" is accessed to read a document file with the same division job ID as the division job ID assigned to the correction-target document file. Alternatively, file attributes of each document file may include document access information on a document file whose division job ID is the same value as that of the each document file.

For example, the file attributes of a certain document file with document ordinal position information "2" may include document access information on a document file whose document ordinal position information is "1" of division job ID that is the same value as that of the certain document file. And, the file attributes of the certain document file with document ordinal position information "2" may also include document access information on a document file whose document ordinal position information is "3" of division job ID that is the same value as that of the certain document file.

In this way, the document file conversion unit 313 may generate each document file so that its file attributes include document access information on a document file having the same division job ID as that of each document file and having the document ordinal position information indicating the previous or be following ordinal position.

In this case, document files with document ordinal position information indicating ordinal positions before and after that of a user-selected correction-target document file can be read by obtaining, from the file attributes of the correction-target document file, document access information indicating the storage locations of the document files before and after the correction-target document file. Then, from the file attributes of each of the document files thus read, document files before and after the document file read can further be read. By repeating the reading of document files from the file attributes of document files read, all the document files assigned with the same division job ID as the correction-target document file can be read.

Thus, according to the present modification, in a case when a division position is corrected using only a correction-target document file and document files before and after the correction-target document file, it takes a shorter time for the page image group generation unit 832 to generate a group of page images. This consequently enables faster activation of the division correction instruction unit 113 and more efficient division correction.

Embodiment 2

In the method described in Embodiment 1, a file path (document access information), which is where a document file is saved, is included in generated-document information as information for accessing the document file. However, in a case when after document files are generated, some of the document files are deleted by a user or a system, it is no longer possible to access and to read a target document file.

Then, a group of page images cannot be re-generated to display thumbnails on the document division correction screen 700 in FIG. 7.

Thus, in a method described in the present embodiment, in the event of generating document files by dividing a group of scan images produced by scanning of a plurality of documents, divided scan images that have yet to be converted into files are saved as well. Then, the location where data on a divided scan images is saved (document page image information) is included in generated-document information on each document file. Differences between the present embodiment and the first embodiment are mainly described. Configurations and processing not particularly described are the same as those of Embodiment 1.

Figure 18:
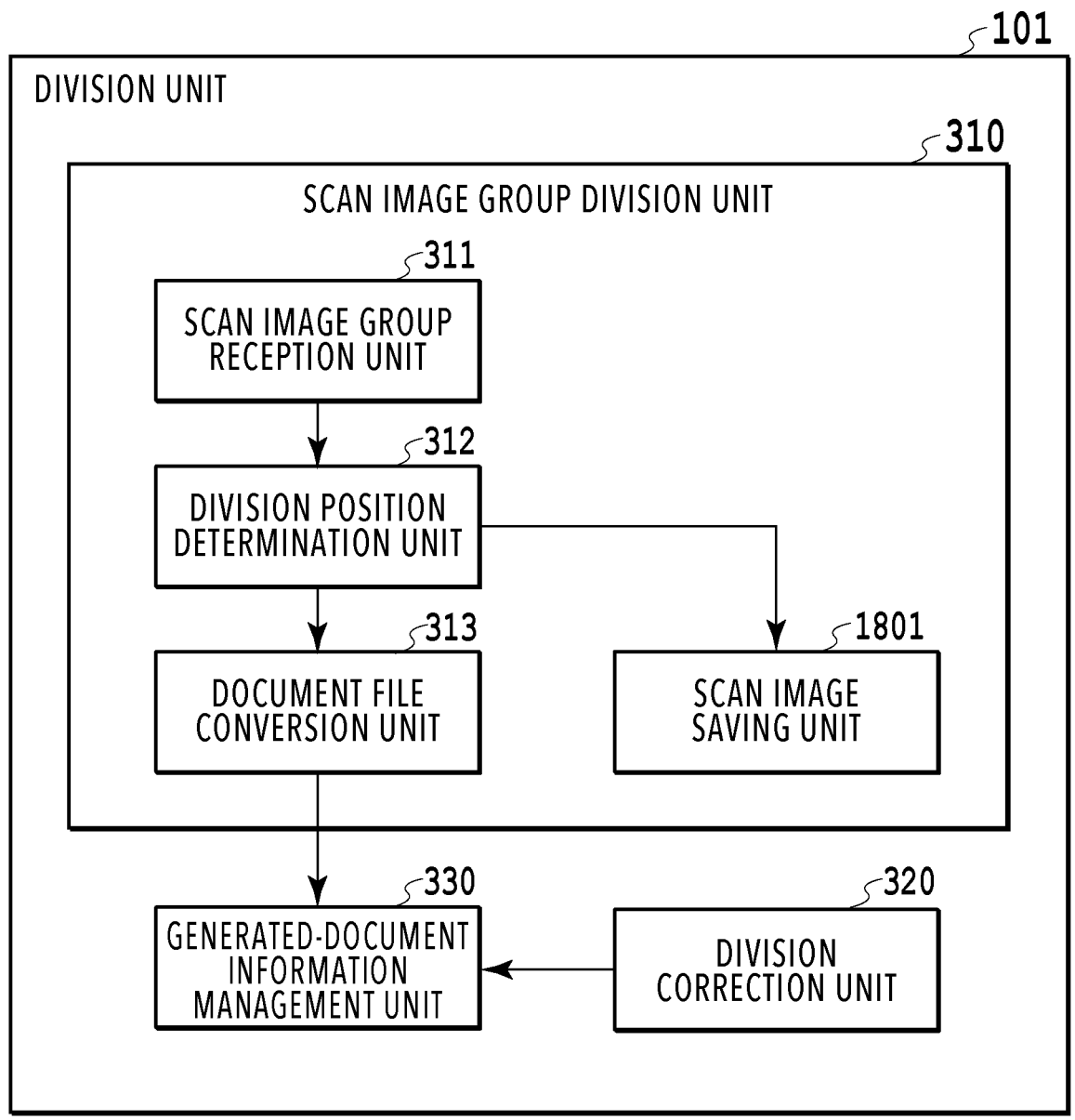
FIG. 18 is a block diagram showing details of the functions of the division unit of the information processing apparatus.

FIG. 18 is a detailed functional block diagram of the division unit 101 of the information processing apparatus 100 of the present embodiment. Configurations that are the same as those in Embodiment 1 are denoted by the same reference numerals as those used in Embodiment 1 and are not described here. The scan image group division unit 310 has a scan image saving unit 1801 in addition to the functional units described in Embodiment 1.

In save regions in the storage apparatus 205 of the information processing apparatus 100, the scan image saving unit 1801 saves scan images produced by the division position determination unit 312 by dividing a group of scan images received by the scan image group reception unit 311. Although each divided set of scan images may include a single scan image or a plurality of scan images, it is described as singular as a divided scan image below. In the present embodiment, the scan image saving unit 1801 converts a divided scan image into TIFF format, which handles a plurality of images within a single file and saves the TIFF file in a predetermined folder. The divided scan image thus saved may be automatically deleted after a predetermined period of time.

Note that, as will be described later, the scan image saving unit 1801 may save an image file produced by merging images converted from document files. However, for descriptive convenience, an image saved and managed by the scan image saving unit 1801 is called a (divided) scan image. Alternatively, an image saved and managed by the scan image saving unit 1801 may be also called a document page image.

The generated-document information management unit 330 adds and saves, as a log, the "generated-document information" including information for reading the divided scan image saved by the scan image saving unit 1801 to the ROM 203 or the storage apparatus 205 of the information processing apparatus.

FIG. 19 is a diagram showing an example of "generated-document information" of the present embodiment. Each row of the table in FIG. 19 holds "generated-document information" corresponding to a single document file. As with the "generated-document information" in FIG. 5B in Embodiment 1, columns 1901 to 1903 hold division job ID, document ordinal position information, and document access information, respectively. The "generated-document information" in the present embodiment additionally has a column 1904 holding "document page image information." The document page image information is a file path for reading a TIFF file, which is a file on a divided scan image.
[Processing to Generate a Document Division Correction Screen]

Figure 20:
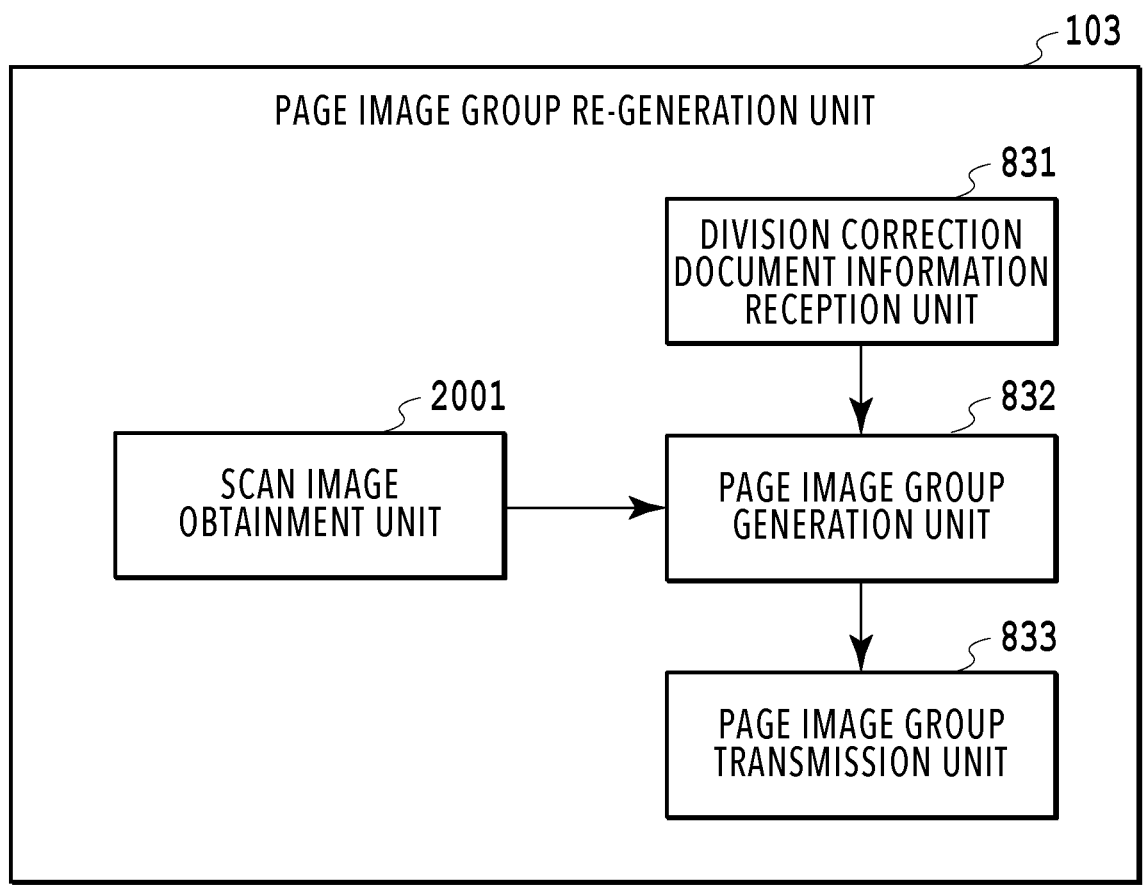
FIG. 20 is a block diagram showing details of the functions of the page image group re-generation unit.

FIG. 20 is a detailed functional block diagram of the page image group re-generation unit 103 of the information processing apparatus 100. Configurations that are the same as those in Embodiment 1 are denoted by the same reference numerals as those used in Embodiment 1 and are not described here. The page image group re-generation unit 103 has a scan image obtainment unit 2001 in addition to the functional units described in Embodiment 1.

Figure 21:
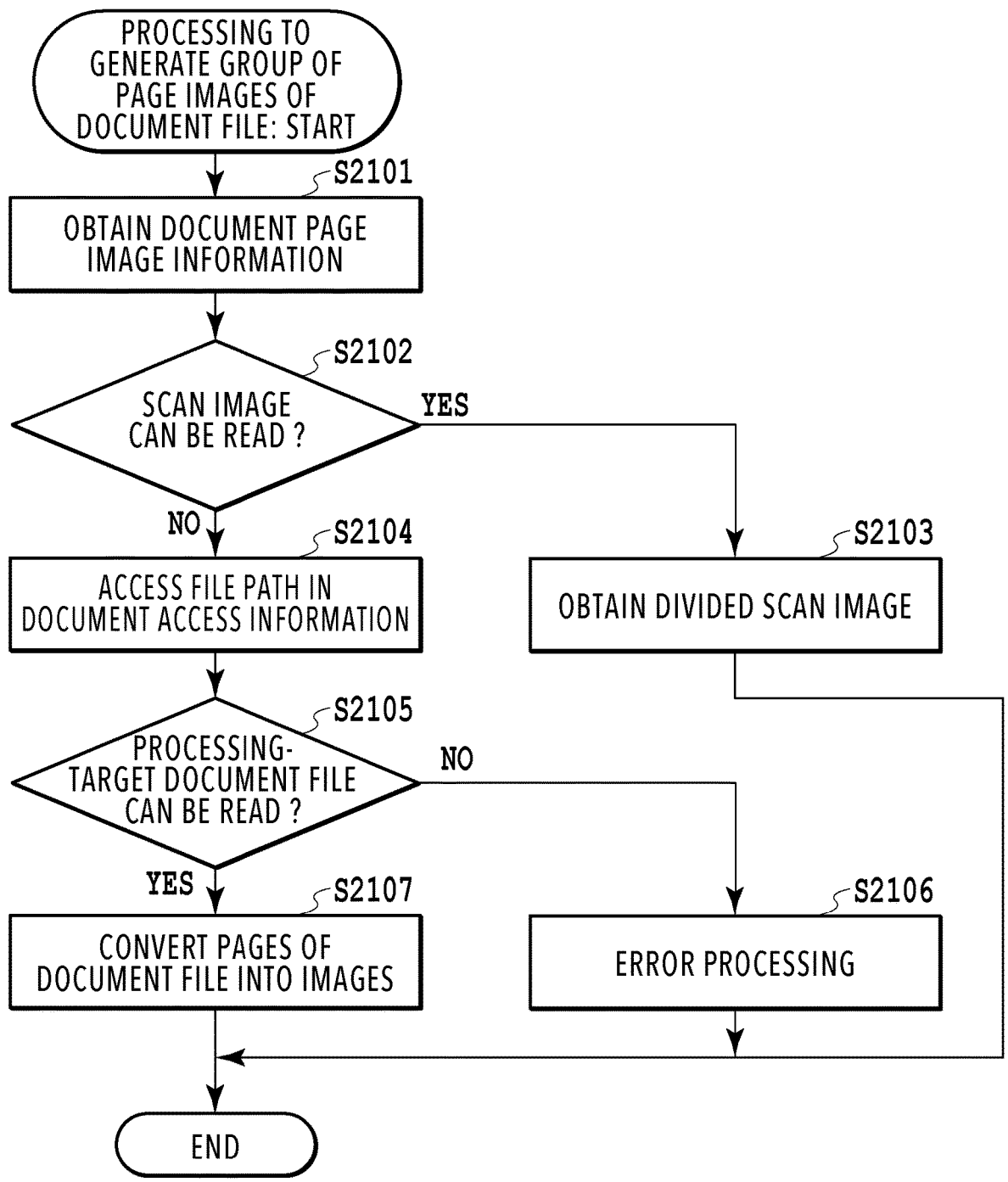
FIG. 21 is a flowchart of processing to generate a group of page images of a document file.

FIG. 21 is a flowchart illustrating details of S906 (the processing to generate a group of page images of a document file) of the present embodiment within the flowchart in FIG. 9 for generating a group of page images corresponding to the thumbnails 703 on the document division correction screen 700 in FIG. 7. Specifically, FIG. 21 is a flowchart corresponding to FIG. 10 in Embodiment 1.

In S2101, the scan image obtainment unit 2001 obtains document page image information included in the column 1904 of the processing-target "generated-document information." For example, in a case when the processing-target "generated-document information" is the information on the row 1905 in FIG. 19, "¥¥server01¥image¥20211012_001_001.tiff" is obtained.

In S2102, the scan image obtainment unit 2001 determines whether a divided scan image can be read by access to the file path indicated by the document page image information obtained in S2101.

If the post-division scan image has been successfully read (YES in S2102), the processing proceeds to S2103. In S2103, the page image group generation unit 832 sets the divided scan image read by access to the file path indicated by the document page image information, as a group of page images of the document file corresponding to the processing-target "generated-document information."

If it is determined that post-division scan image cannot be read (NO in S2102), processing in S2104 to S2107 is performed. S2104 to S2107 are the same processing as S1001 to S1004 in FIG. 10. Specifically, the page image group generation unit 832 accesses the document access information to read a document file, converts the document file into images, and sets the converted images as a group of page images of the document file corresponding to the processing-target "generated-document information."
[Document File Division Correction Processing]

Figure 22:
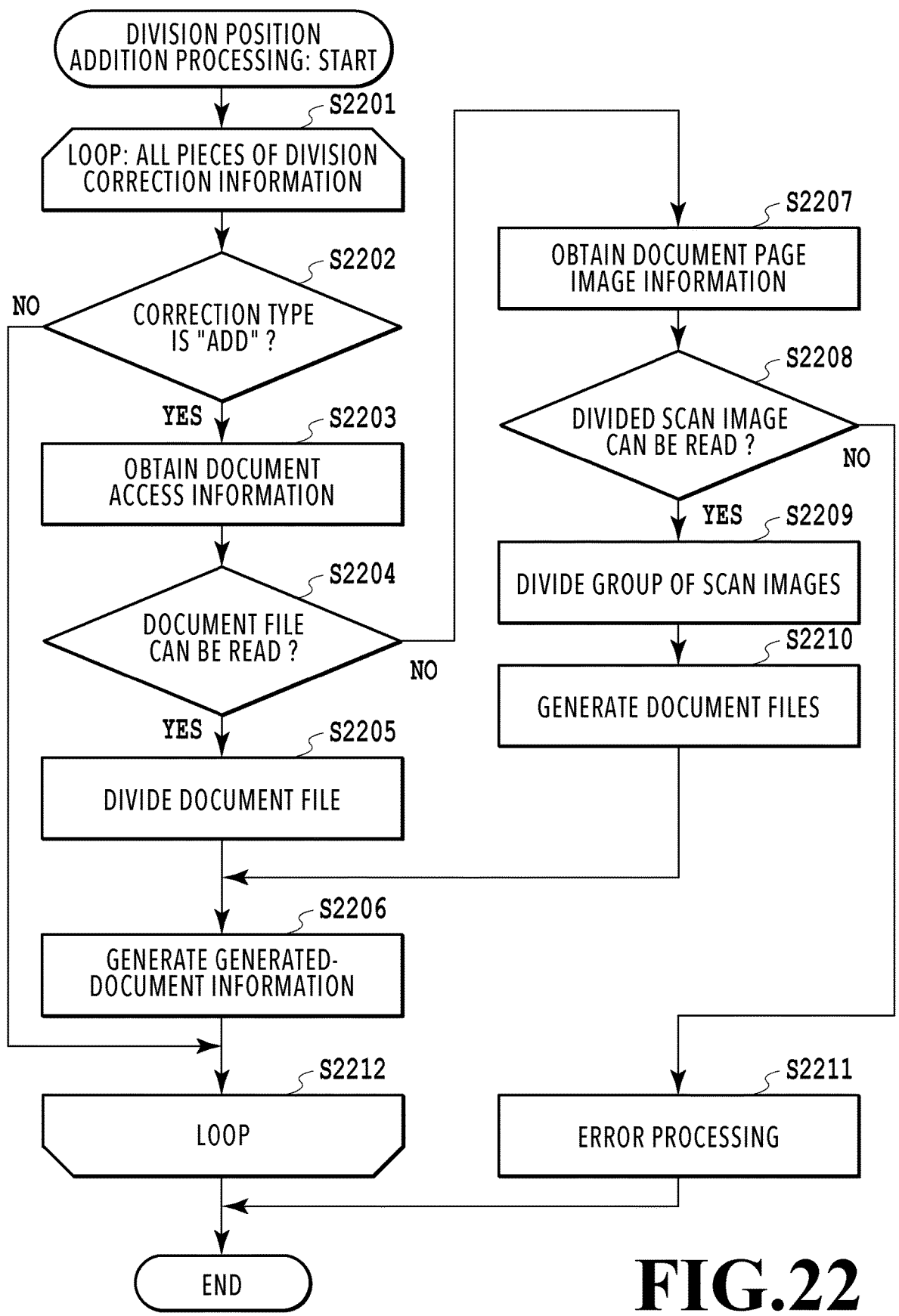
FIG. 22 is a flowchart of division position addition processing.

FIG. 22 is a detailed flowchart of division position addition processing in S1405 in the flowchart in FIG. 14 according to the present embodiment. In other words, FIG. 22 is a flowchart according to the present embodiment corresponding to FIG. 15 of Embodiment 1. Division position addition processing of the present embodiment is described using FIG. 22.

S2201 to S2212 are processing performed in a loop. In S2201, the division position correction unit 322 selects processing-target "division correction information" from the pieces of "division correction information" received by the division correction information reception unit 321.

S2202 and S2203 are the same as S1502 and S1503 in FIG. 15 and are, therefore, not described here. If the division position correction unit 322 determines, in S2204, that the document file has been successfully read by access to the file path indicated by the document access information obtained in S2203 (YES in S2204), the processing proceeds to S2205. S2205 is the same processing as S1505 and is, therefore, not described here.

Meanwhile, if the division position correction unit 322 determines, in S2204, that the document file cannot be read by access to the file path indicated by the document access information obtained in S2203 (NO in S2204), the processing proceeds to S2207, not performing error processing.

In S2207, the division position correction unit 322 obtains the value of document ordinal position information held in the processing-target "division correction information." Then, the division position correction unit 322 extracts, from the pieces of "generated-document information" obtained in S1404, one whose document ordinal position information is the same value as the value of the document ordinal position information obtained above. Then, the division position correction unit 322 obtains document page image information included in the "generated-document information" thus extracted. For example, in a case when the row 1307 in FIG. 13B is the current processing target, "2" is obtained as the value of the document ordinal position information. Then, in a case when the pieces of "generated-document information" obtained in S1404 are the rows 1905 to 1907 of the table in FIG. 19, the "generated-document information" on the row 1906 of the table in FIG. 19 holds "2" as document ordinal position information. Thus, "¥¥server01¥image¥20211012_001_002.tiff," which is the "document page image information" on the row 1906 of the table in FIG. 19, is obtained.

In S2208, the division position correction unit 322 determines whether a divided scan image can be read by access to the file path indicated by the document page image information obtained in S2207. If it is determined that the divided scan image cannot be read (NO in S2208), the division position correction unit 322 performs error processing in S2211, gets out of the loop processing, and ends the processing of this flowchart.

Meanwhile, if it is determined that the divided scan image has been successfully read (YES in S2208), the processing proceeds to S2209. The divided scan image thus read is, in principle, a group of images for a plurality of pages. In S2209, the division position correction unit 322 divides the group of images for a plurality of pages thus read, according to the division position included in the "division correction information" of the current processing target. Although a divided image produced by the division in S2209 may be a single image or a group of images for a plurality of pages, it is described as a single scan image here. Two scan images produced by the further division of the divided scan image in S2209 are saved by the scan image saving unit 1801.

In S2210, the division position correction unit 322 converts the two scan images obtained in S2209 into document files in the same format as document files into which the document file conversion unit 313 converts images. Specifically, in the present embodiment, the two scan images are converted into PDF document files. The document file saving unit 102 saves the two document files thus produced by the conversion.

S2206 is the same processing as S1506. The results of the division position addition processing are reflected in the generated-document information to generate "generated-document information correction results."

If it is determined in S2212 that the processing in S2202 to 2210 has been completed on all the pieces of "division correction information" received by the division correction information reception unit 321, the processing of the flowchart in FIG. 22 ends.

The table in FIG. 24A is an example of "generated-document information correction results" generated after the division position addition processing is performed on each of the pieces of the "generated-document information" on the rows 1905 to 1907 of the table in FIG. 19 according to the "division correction information" on the row 1307 in FIG. 13B. The "generated-document information correction results" additionally have a column 2405 for holding "correction target" as described in Embodiment 1. Also, as shown with the rows 2407 and 2408, file paths indicating where the two scan images produced in S2209 are saved are held as document page image information in a column 2404.

Figure 23:
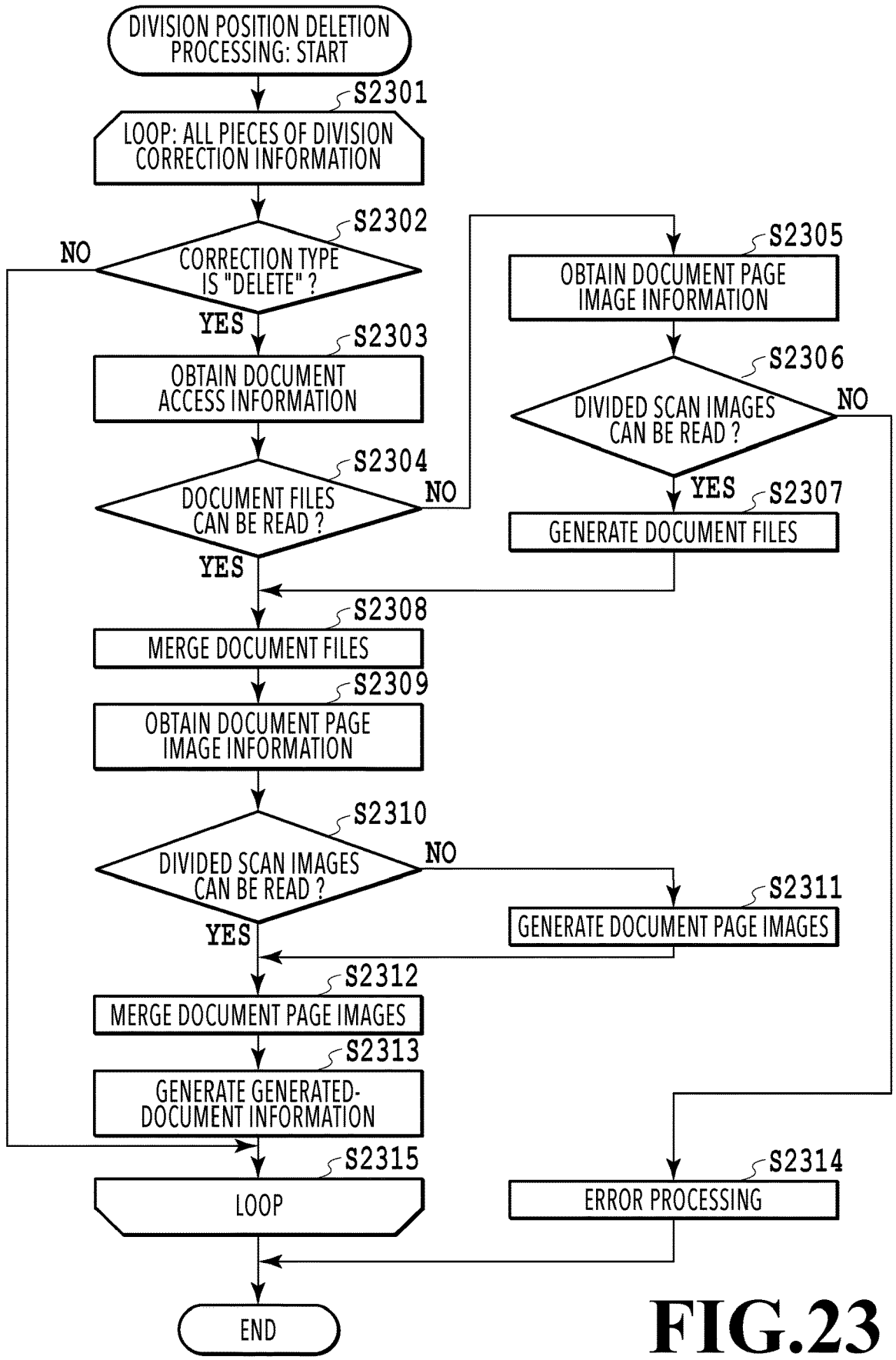
FIG. 23 is a flowchart of division position deletion processing.

FIG. 23 is a detailed flowchart of division position deletion processing in S1406 in the flowchart in FIG. 14 according to the present embodiment. In other words, FIG. 23 is a flowchart of the present embodiment corresponding to FIG. 16 of Embodiment 1. Division position deletion processing of the present embodiment is described using FIG. 23.

S2301 to S2315 are processing performed in a loop. In S2301, the division position correction unit 322 selects processing-target "division correction information" from the pieces of "division correction information" received by the division correction information reception unit 321.

S2302 and S2303 are the same processing as S1602 and S1603 in FIG. 16 and are, therefore, not described here. If the division position correction unit 322 determines in S2304 that the two document files have been successfully read by access to the file paths indicated by the pieces of document access information obtained in S2303 (YES in S2304), the processing proceeds to S2308.

Meanwhile, if the division position correction unit 322 determines in S2304 that neither of the two document files can be read by access to the file paths indicated by the pieces of document access information obtained in S2303 (NO in S2304), the processing proceeds to S2305, not performing error processing.

In S2305, the division position correction unit 322 obtains the value of document ordinal position information included in the processing-target "division correction information." Then, the division position correction unit 322 extracts, from the pieces of "generated-document information" obtained in S1404, one whose document ordinal position information has the same value as the value of the document ordinal position information obtained above. The division position correction unit 322 also extracts the "generated-document information" on the next row below the "generated-document information" extracted above. Note that, in a case when "generated-document information correction results" have been generated by the division position addition processing in previous S1405, target information is extracted from the "generated-document information correction results." Then, the division position correction unit 322 obtains pieces of document page image information included in the extracted pieces of "generated-document information" or the "generated-document information correction results."

For example, in a case when the row 1306 in FIG. 13B is the "division correction information" of the current processing target, "1" is obtained as the value of the document ordinal position information. Also, in a case when the rows 2406 to 2409 of the table in FIG. 24A hold the "generated-document information correction results" having the results of the addition processing reflected therein, the row 2406 of the table in FIG. 24A holds "1" as document ordinal position information. Thus, pieces of document page image information on the row 2406 and on the row 2407 below in the table in FIG. 24A are obtained. Specifically, "¥¥server01¥image¥20211012_001_001.tiff" and "¥¥server01¥image¥20211012_001_002-1.tiff" are obtained as the pieces of document page image information.

In S2306, the division position correction unit 322 determines whether divided scan images can be read by access to file paths indicated by the pieces of document page image information obtained in S2305. If it is determined that the divided scan images cannot be read (NO in S2306), the division position correction unit 322 performs error processing in S2314, gets out of the loop processing, and ends the processing of this flowchart.

If it is determined that the divided scan images can be read (YES in S2306), the processing proceeds to S2307. In S2307, the division position correction unit 322 converts the two divided scan images read by the access to the file paths indicated by the pieces of document page image information obtained in S2305 into document files. The division position correction unit 322 converts the two divided scan images to document files in the same file format as document files into which the document file conversion unit 313 converts images. Specifically, in the present embodiment, the two divided scan images are converted into document files in PDF format.

In S2308, the division position correction unit 322 merges the document files. If it is determined "YES" in S2304, the division position correction unit 322 merges the two document files read by access to the document access information, like in S1605. If it is determined "NO" in S2304, the division position correction unit 322 merges the two document files generated by converting the two divided scan images read by access to the file paths indicated by the document page image information.

Note that, in a case when only one of the two document files is read in S2304, in S2308, the document file read by access to the document access information may be merged with a document file generated by converting a scan image read by access to the document page image information.

S2309 to S2312 performed next are processing to generate an image corresponding to the document file generated in S2308.

In S2309, like in S2305, the division position correction unit 322 extracts, from the pieces of "generated-document information" obtained in S1404, one whose document ordinal position information has the same value as the document ordinal position information included in the processing-target "division correction information." The division position correction unit 322 also extracts the "generated-document information" on the next row below the "generated-document information" extracted above. Then, the division position correction unit 322 obtains pieces of document page image information included in the respective extracted pieces of "generated-document information."

In S2310, like in S2306, the division position correction unit 322 determines whether the two divided scan images can be read by access to the file paths indicated by the pieces of document page image information obtained in S2309. If it is determined that the divided scan images cannot be read (NO in S2310), the processing proceeds to S2311. Meanwhile, if it is determined that the divided scan images can be read (YES in S2310), the processing skips S2311, and proceeds to S2312.

In S2311, the division position correction unit 322 converts the two document files read by access to the document access information obtained in S2303 into images.

In S2312, the division position correction unit 322 generates an image corresponding to the document file generated in S2308. In a case when the division position correction unit 322 is in S2312 after determining "YES" in S2310, the division position correction unit 322 merges the two divided scan images read by access to the file paths indicated by the document page image information. Meanwhile, in a case when the division position correction unit 322 is in S2312 after S2311, the division position correction unit 322 merges the images generated in S2311. The merged images are saved as a single image file by the scan image saving unit 1801.

S2313 is the same processing as S1606 and reflects the results of the division position deletion processing in the "generated-document information" or the "generated-document information correction results" to generate "generated-document information correction results."

In S2215, if the processing in S2302 to S2313 has been completed on all the pieces of "division correction information" received by the division correction information reception unit 321, the processing in the flowchart in FIG. 23 ends.

The table in FIG. 24B is an example of the "generated-document information correction results" obtained by updating the pieces of "generated-document information correction results" held in the rows 2406 to 2409 in FIG. 24A as a result of the deletion processing performed in accordance with the "division correction information" in the row 1306 in FIG. 13B. The "generated-document information correction results" additionally have the column 2405 for holding "correction target," as described in Embodiment 1. Also, as shown in the row 2406, the column 2404 holds, as document page image information, a file path indicating the location where the image produced by merging the two images in S2312 is saved.

As thus described, according to the present embodiment, even in a case when a document file cannot be read by access to the document access information, error processing is not performed, and the processing can be carried on.

The present disclosure can cause less trouble correcting document files generated by division of a group of scan images for a plurality of pages.

Other Embodiments

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
one or more memories that store instructions; and
one or more processors that execute the instructions:
to obtain scan images produced by collectively scanning a plurality of documents, each of which includes one or more pages;
to divide the obtained scan images into divided scan images corresponding to the respective plurality of documents;
to convert the divided scan images into files in a predetermined format and thereby to generate a plurality of files;
to save the plurality of files individually;
to manage an identifier common to the plurality of files, ordinal position information of the plurality of files, and information identifying each of the individually saved plurality of files in association with each other; and
to display, if a user instructs to correct one of the individually saved plurality of files after the plurality of files are saved individually, thumbnails of page images corresponding to the individually saved plurality of documents identified by the information managed in association with the same identifier as an identifier associated with information identifying the one file instructed to be corrected,
wherein the thumbnails are displayed, based on the ordinal position information of the plurality of files, in an order in which the pages forming the plurality of files were scanned.

2. The information processing apparatus according to claim 1, wherein the ordinal position information represents an order in which the plurality of files were generated.

3. The information processing apparatus according to claim 1, wherein the thumbnails are generated based on the individually saved plurality of documents.

4. The information processing apparatus according to claim 1, wherein a display form of thumbnails of page images corresponding to the one file is different from a display form of other thumbnails of page images corresponding to other files.

5. The information processing apparatus according to claim 1, wherein the one or more processors further display a mark indicating a division position corresponding to the plurality of documents at a position corresponding to the division position in the displayed thumbnails.

6. The information processing apparatus according to claim 1, wherein the generated plurality of files are saved individually in predetermined save destinations.

7. The information processing apparatus according to claim 1, wherein the one or more processors correct a division position corresponding to the one file in the displayed thumbnails so as to produce files by dividing the scan images for the plurality of pages at a corrected division position.

8. The information processing apparatus according to claim 7, wherein the corrected division position is a position based on an instruction made by a user.

9. The information processing apparatus according to claim 1, wherein the information for identifying the file is a file path in a file system.

10. The information processing apparatus according to claim 1, wherein the information for identifying the file is a document identifier in a document management system.

11. An information processing method comprising:
obtaining scan images produced by collectively scanning a plurality of documents, each of which includes one or more pages;
dividing the obtained scan images into divided scan images corresponding to the respective plurality of documents;
converting the divided scan images into files in a predetermined format and thereby generating a plurality of files;
saving the plurality of files individually;
managing an identifier common to the plurality of files, ordinal position information of the plurality of files, and information identifying each of the individually saved plurality of files in association with each other; and
displaying, if a user instructs to correct one of the individually saved plurality of files after the plurality of files are saved individually, thumbnails of page images corresponding to the individually saved plurality of documents identified by the information managed in association with the same identifier as an identifier associated with information identifying the one file instructed to be corrected,
wherein the thumbnails are displayed, based on the ordinal position information of the plurality of files, in an order in which the pages forming the plurality of files were scanned.

12. A non-transitory computer readable storage medium storing a program that causes a computer to perform an information processing method, the information processing method comprising:
obtaining scan images produced by collectively scanning a plurality of documents each of which includes one or more pages;
dividing the obtained scan images into divided scan images corresponding to the respective plurality of documents;
converting the divided scan images into files in a predetermined format and thereby generating a plurality of files;
saving the plurality of files individually;
managing an identifier common to the plurality of files, ordinal position information of the plurality of files, and information identifying each of the individually saved plurality of files in association with each other; and
displaying, if a user instructs to correct one of the individually saved plurality of files after the plurality of files are saved individually, thumbnails of page images corresponding to the individually saved plurality of documents identified by the information managed in association with the same identifier as an identifier associated with information identifying the one file instructed to be corrected,
wherein the thumbnails are displayed, based on the ordinal position information of the plurality of files, in an order in which the pages forming the plurality of files were scanned.

* * * * *